United States Patent [19]

Neidell

[11] E Re. 31,509

[45] Reissued Jan. 24, 1984

[54] ECHO LOCATION SYSTEMS

[76] Inventor: Norman S. Neidell, 908 Town and Country Blvd., Suite 420, Houston, Tex. 77024

[21] Appl. No.: 183,396

[22] Filed: Sep. 2, 1980

Related U.S. Patent Documents

Reissue of:

[64] Patent No.: 4,114,153
Issued: Sep. 12, 1978
Appl. No.: 691,674
Filed: Jun. 1, 1976

U.S. Applications:

[63] Continuation of Ser. No. 483,202, Jun. 26, 1974, abandoned.

[51] Int. Cl.[3] ..... G01S 13/58

[52] U.S. Cl. ..... 343/9 R; 343/378; 367/100

[58] Field of Search ..... 343/5 NQ, 9 R, 100 PE, 343/100 CL; 367/90, 100

[56] References Cited

U.S. PATENT DOCUMENTS

| | | | |
|---|---|---|---|
| 3,377,587 | 4/1968 | Nakahara et al. | 343/8 X |
| 3,440,653 | 4/1969 | Le Mair et al. | 343/9 |
| 3,829,860 | 8/1974 | Cutler et al. | 343/9 |
| 4,028,699 | 6/1977 | Stevens | 343/9/ |
| 4,067,009 | 1/1978 | Constant | 343/5 CM |
| 4,308,536 | 12/1981 | Sims, Jr. et al. | 343/7 VM |

*Primary Examiner*—T. H. Tubbesing
*Attorney, Agent, or Firm*—Pravel, Gambrell, Hewitt, Kirk & Kimball

[57] ABSTRACT

This invention generally relates to echo location or ranging systems in which the individual properties of targets or reflectors (such as range, bearing, elevation angle, relative velocity, impedance contrast, etc.) in a field of targets within some propagation medium are identified by the emission of signals into the propagation medium and processing of the detected reflections from the target field.

46 Claims, 19 Drawing Figures

T -TRANSMITTER
R1 -RECEIVER 1
R2 -RECEIVER 2
● -TARGET I
⊙ -TARGET J
○ -TARGET K

I1 - LOCUS OF TARGET I FOR RECEIVER 1
J1 - LOCUS OF TARGET J FOR RECEIVER 1
K1 - LOCUS OF TARGET K FOR RECEIVER 1
I2,J2,K2 - DEFINED ANALOGOUSLY

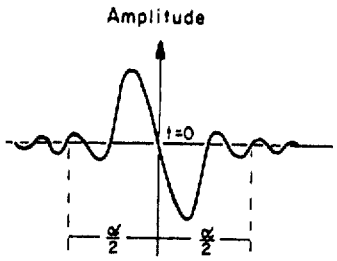

Time Domain: $f_0(t)$
($f_0(t)$ is an odd function)

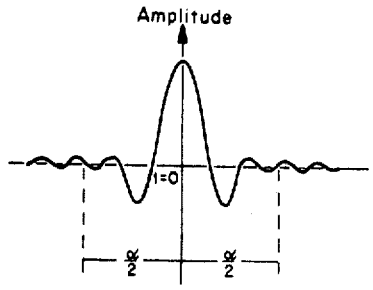

Time Domain: $f_1(t)$
($f_1(t)$ is an even function)

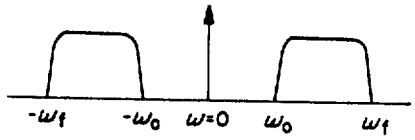

Frequency Domain:
Amplitude Spectrum of $f_0(t)$ and $f_1(t)$
defined as $F(\omega)$

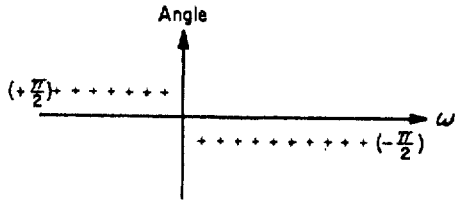

Frequency Domain:
Phase Spectrum of $f_0(t)$ $$F_0(\omega) = \int_{-\infty}^{\infty} f_0(t) e^{-i\omega t}\, dt = F(\omega) e^{-i\, sgn(\omega)\frac{\pi}{2}}$$

$$= -i\, sgn(\omega)\, F(\omega)$$

Where $sgn(\omega) = +1$, $\omega > 0$
$sgn(\omega) = -1$, $\omega < 0$

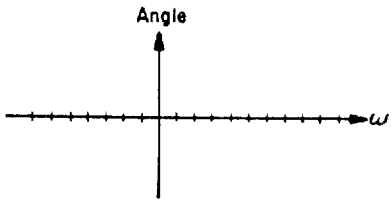

Frequency Domain:
Phase Spectrum of $f_1(t)$ $$F_1(\omega) = \int_{-\infty}^{\infty} f_1(t) e^{-i\omega t}\, dt = F(\omega)$$

TIME DOMAIN AND COMPLEX FREQUENCY DOMAIN (IN POLAR FORM)
REPRESENTATIONS OF THE FUNCTION PAIR $f_0(t)$, $f_1(t)$

Figure 12

Target in Figure is approaching transceiver. The return signal is shrunken with all frequencies shifting linearly to higher ones.

GRAPHICAL EVOLUTION OF THE PRODUCT $|F(\omega)||F(\frac{\omega}{S})|$
THE FREQUENCY DOMAIN EQUIVALENT OF $k_0(St) * k_0(t)$ OR $k_1(St) * k_1(t)$ Echolocation Computer Simulation For Three Moving Targets (With And Without Noise) Using Klauder Base Signal Pair And Constant Phase Encoding

ECHO LOCATION SYSTEMS

Matter enclosed in heavy brackets [ ] appears in the original patent but forms no part of this reissue specification; matter printed in italics indicates the additions made by reissue.

This is a continuation of application Ser. No. 483,202, filed June 26, 1974, now abandoned.

BACKGROUND OF THE INVENTION

Echo location systems are designed to identify some subset of individual reflector or target parameters. These parameters include the target position in terms like bearing and elevation angle, the range, target relative velocity and the impedance contrast which causes the echo and is also a measure of target quality. Individual targets distributed with a propagation medium make up a target field. The propagation medium can be attenuative and preferentially cause the loss of the higher frequency components of a propagating signal according to some physical law. Additionally, the propagation medium can be dispersive causing the different frequency components of a signal to travel with different velocities hence, introducing distortions of phase and equivalency of form into the propagating signal as a function of its travel.

Such known echo systems emit a signal or signals into the propagation medium; the identification process involves detecting the echo train and performing a variety of appropriate analyses. While this procedure is conceptually straight forward, there are a number of practical difficulties which act to complicate, degrade and make ambiguous such identifications.

First, there is a noise background to consider which is almost always a problem in systems where signals are transmitted and detected. Noise is defined in this instance as any contribution which is not a part of the particular identification process and has as its sources such elements as incoherent scattering by the propagation medium or even the targets themselves. There are a variety of techniques for the detection and enhancement of signals in the presence of noise.

Next, there is the inherent ambiguity between the range and the relative velocity of a target. A moving target can not only stretch or shrink a returning echo signature depending on the sense of its motion, but will also delay or speed up the time of its detection, hence affecting the range calculation. Once again, there are a variety of known techniques which can resolve this ambiguity. It is widely recognized that continuous wave signals, for example, a persistent sinusoid at a single frequency can provide good resolution of the target's relative by means of the Doppler frequency shift. The companion range resolution of such a signal is necessarily poor since its character is indistinguishable from cycle to cycle. Very short duration signals are affected only slightly by target motion and while they provide good resolution in detection time, they convey little or no information about relative velocities. The chirp signal described by Klauder, Price, Darlington and Albersheim in the Bell System Technical Journal, Vol. 39, pp 745–808, July 1960, represents a compromise having ambiguity in both velocity and range. Its advantages lie rather in effectiveness of equipment utilization and the noise suppression of its companion correlation detection.

Lastly, there is the problem of resolving target angular parameters such as elevation and/or bearing. Currently, definition of angles is achieved by the use of arrays of broad-beam source or receiver elements, or else by means of narrow-beam source or receiver elements. In both cases, the space in which the target field is distributed must be scanned or viewed only one small part at a time. Scanning is accomplished either electronically by steering array beams or sequencing the operation of large numbers of elements, or even mechanically by rotating operational narrow-beam elements to new position.

The energy requirements of a scanned system are usually favorable since the entire field of potential targets need not be illuminated at once. On the negative side, however, the individual targets are then not being continuously monitored.

SUMMARY OF THE INVENTION

This invention employs encoded signals followed by the correlation of the received echo train with known signal signatures. A relatively long signal train made up of essentially short signals is used, thereby encompassing both continuous wave and impulse-like properties. The correlation step achieves a measure of noise suppression. Simultaneous high resolution information about range and relative velocity is achieved essentially by means of simultaneous solutions involving use of all of the observables embodied in the signal train after detection by correlation.

Both the sources and receivers operate as broad-beam elements with simultaneous illumination of all targets. Angular resolution is achieved by appropriately interposing phase distorting lenses between the sources and echo receivers. Information about the angles is encoded into the phase character of the propagating signal train. Energy requirements are modest despite the simultaneous illumination of the entire field of targets because the high repetition rate of the system allows that a rather low echo signal level be tolerated. Also, since range and velocity resolution are not directly dependent on the use of high frequency signal components, lower frequency band signals may be used with correspondingly less energy loss through attenuation.

Even if the propagating medium does modify the traveling signals by altering their amplitude and phase spectral properties, the system described by the invention will be able to function nevertheless. Some empirical corrections would then have to be made to compensate for the propagation effects, but these could be easily determined by calibration studies using targets of known parameters.

BRIEF DESCRIPTION OF THE DRAWINGS

FIG. 12 shows the time and Fourier frequency domain properties of a design base signal pair having respectively odd and even symmetry;

DETAILED DESCRIPTION OF THE INVENTION

Figure 1:
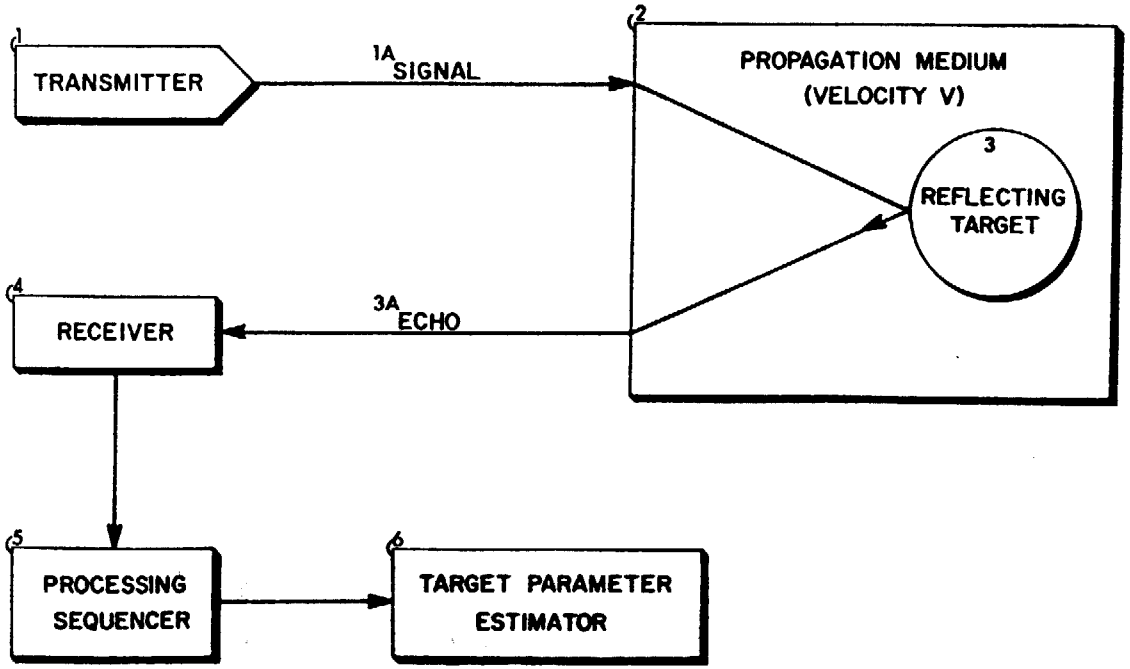
FIG. 1 shows an embodiment of the invention with a single transmitter, receiver and target.
Figure 2:
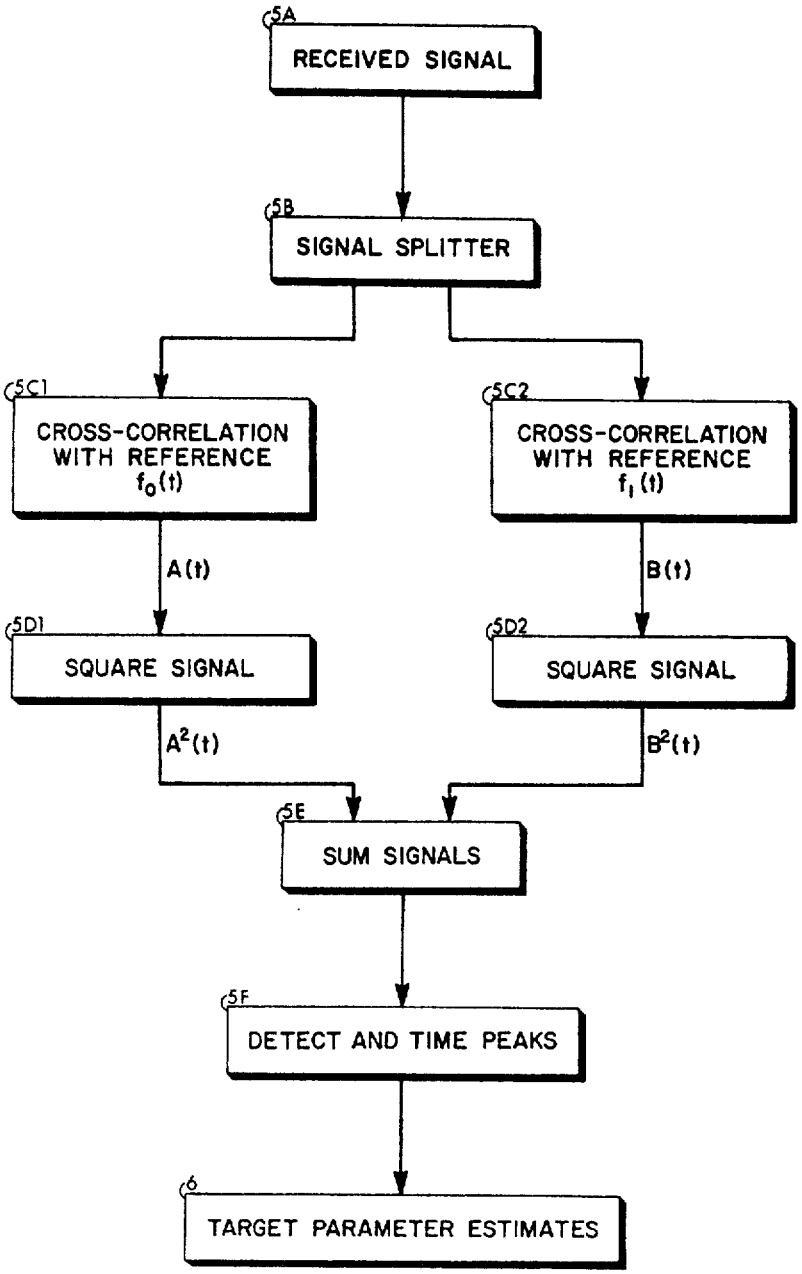
FIG. 2 shows a processing sequence for the embodiment shown in FIG. 1 with a single transmitter, receiver and target.

FIGS. 1 and 2 show an elementary echo location system of the invention.

A suitable transmitter 1 emits a signal train 1A having at least two members into a propagation medium 2 in which is embedded a reflecting target 3. An echo 3A from the target propagates to a receiver 4 where it is detected and sent on to the processing sequencer 5. The outputs of the processing sequencer are directly interpretable as the target parameter estimator 6, which gives the relative velocities between the source or transmitter 1, receiver 4, and reflecting target 3, and the range to the reflecting target 3 as a sum of the distance to the transmitter 1 and the receiver 4. It should be understood that transmitter 1 and receiver 4 may be coincident.

The system shown in FIG. 1 embodies components which are essentially standard for the particular application. For example, in the case of a sonar system, transmitter 1 might be a transducer capable of introducing pressure waves into the water of a form and sequence prescribed by a control signal. Receiver 4 might be a hydrophone while a submarine can serve as reflecting target 3. In this instance the sea water would be the propagation medium 2 and processing sequencer 5 could be simple electronic network of alternatively digital logic accomplishing equivalent operations.

At least two signals are needed in the outgoing train to provide a calibration standard to separate the contribution of the relative velocity to the echo arrival time from the effect of target range. By such means, the echo location system described is capable of simultaneously making quite simple, highly resolved estimates of both the target relative velocity and range.

Each member signal of the outgoing train has like polarization characteristics if these are applicable and a common amplitude spectrum as defined by the modulus of the exponential Fourier transform. Further, the common amplitude spectrum F(w) is essentially flat or smoothly unimodal over the ranges of positive and negative angular frequencies $w_o \leqq |w| \leqq w_f$ and zero for practical purposes outside the band as defined by these constant limiting frequencies $w_o$, $w_f$.

Additionally, each member signal will be a linear combination of a pair of base signals $f_o(t)$, $f_f(t)$ which have the following properties to the practical approximation required by the system:

I. $f_o(t)$, $f_f(t)$ share the common amplitude spectrum F(w) as described.

II. There is a finite time interval of duration $\alpha$, before and after which both $f_o(t)$ and $f_f(t)$ may be considered to be zero.

III. $f_o(t)$ and $f_f(t)$ are in quadrature. Every Fourier frequency component necessary for the description of $f_o(t)$ is displaced in phase as measured from any origin in time by 90° from its counterpart in the description of $f_f(t)$. Property I above implies that all Fourier frequency components are present in approximately equal amounts in $f_o(t)$ and $f_f(t)$.

As a mathematical formalism, Property III states that $f_o(t)$ and $f_f(t)$ are a Hilbert transform pair at least to the accuracy of the system and $$f_f(t) = \frac{1}{\pi} \int_{-\alpha}^{\alpha} \frac{f_o(u)}{1-u}\, du \qquad 1$$

By way of illustration, several pairs of signals which satisfy the above specified properties are:

I. "Chirp" Signals s(t), c(t)

$$s(t) = A \sin\left(w_c t + \frac{w_f - w_o}{2\alpha} t^2\right) \qquad 2A$$

$$c(t) = A \cos\left(w_c t + \frac{w_f - w_o}{2\alpha} t^2\right)$$

$$A = \text{constant}, s(t) = c(t) = 0 \text{ for } t \geqq \alpha \text{ or } t \leqq 0$$

II. "Klauder" Signals $k_o(t)$, $k_f(t)$ $$k_o(t) = A \frac{\cos w_f t - \cos w_o t}{(w_f - w_o)t} \qquad 2B$$

$$k_f(t) = A \frac{\sin w_f t - \sin w'_o t}{(w_f - w_o)t}$$

$$A = \text{constant}; k_o(t) = k_f(t) = 0 \text{ for } t \geqq \frac{|\alpha|}{2}$$

III. "Gabor" Signals $g_o(t)$, $g_f(t)$ $$g_o(t) = A\frac{(1/t_o)^2}{1+(1/t_o)^2} \qquad 2C$$

$$g_f(t) = A\frac{1}{1+(1/t_o)^2}$$

$$A = \text{constant};\ g_o(t) = g_f(t) = 0 \text{ for } t \geqq \frac{|\alpha|}{2}$$

$$t_o = \text{constant}$$

FIG. 12 shows the time and frequency domain properties of the Klauder Signals depicted as $f_o(t)$, $f_f(t)$, the base signal pair.

If $f_k(t)$ is a member signal of the outgoing train and there are no distortions introduced by the propagation medium 2, then the received echo 3A for a moving reflecting target 3 will have the mathematical form $$f_k(st-T) \qquad 3$$

T is a time delay associated with the target range at the time of detection while s is a scale factor which arises from the target relative velocity. For a reflecting target fleeing detection, $s>1$ and a stretched signal signature will result. We have assumed a positive impedance contrast between the propagation medium 2 and the reflecting target 3. A "soft" target having a smaller impedance than the medium for signal travel would cause a signal reversal (or equivalently a 180° phase shift in the echo signal 3A.

The stretching or compression of the propagating signal is the familiar Doppler effect and gives rise to the ambiguity in resolution between target relative velocity and target range. Suppose one could recognize some signal characteristic which occurred at $t=t_o$. In the echo 3A it would occur at $t=st_o+T$. If it were assumed, nevertheless, that it occurred at $t=t_o+T$, one would make an error in determining the echo arrival time of $(1-s)t_o$ which would correspondingly cause an error in the estimation of target range.

Signals designed as described, however, have a companion processing sequencer 5 which allows a signal characteristic to be unambiquously identified despite stretching or compression.

One embodiment of this sequencer is shown in FIG. 2. The use of a train of signals of known intervals of separation then allows that s be computed from the changes of such intervals in the echo train 3A. Once s is known, the echo arrival times may be compensated for the target relative velocity effects so that accurate estimates of the target range can be obtained.

Figure 13:
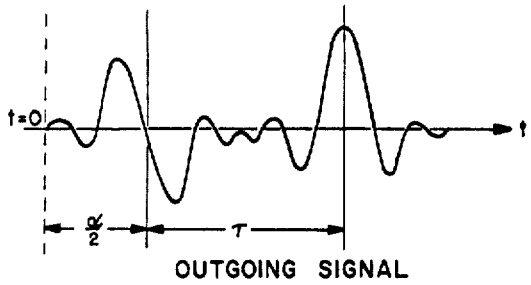
FIG. 13 shows a typical outgoing signal connection of two members.

To illustrate the principle, there is shown in FIG. 13 an outgoing signal train of two members, these being respectively $k_o(t)$ and $k_f(t)$, the Klauder Signals with their origins of definition shifted. In mathematical language, the outgoing train shown is simply given by $$k_o(t-\alpha/2)+k_f(t-\alpha/2-\tau). \qquad 4$$

Further generality can be added by defining $$f_k(t)=ck_o(t)+dk_f(t)$$

$$f_f(t)=ak_o(t)+bk_f(t) \qquad 5$$

where a, b, c, d are constants. Let us also introduce a scaling such that $$\sqrt{c^2+d^2}=\sqrt{a^2+b^2}=1 \qquad 6$$

The outgoing signal train now will be taken to have the more general form $$f_k(t-\alpha/2)+f_f(t-\alpha/2-\tau) \qquad 7$$

The returning echo 3A will then have the following mathematical form $$f_k(s(t-\alpha/2)-T)+f_f(s(t-\alpha/2-\tau)-T). \qquad 8$$

The processing sequencer 5 is shown in FIG. 2. The received signal is divided into two parts by signal splitter 5B. The correlation in parallel of the two parts with $f_o(t)$ and $f_f(t)$, $k_o(t)$ and $k_f(t)$ in this case is effected by cross-correlators 5C1 and 5C2.

One can evaluate the correlation functions A(t), B(t) and their squared functions $A^2(t)$, $B^2(t)$ very simply by considering only the first member signal of the returning echo as given by equation 8. If we relocate the origin of the first member signal of the echo for convenience, the indicated chain of operations gives the following $$A^2(t)=\tfrac{1}{4}[(ck_o(st)+dk_f(st))*k_o(-t)]^2$$

$$B^2(t)=\tfrac{1}{4}[(ck_o(st)+dk_f(st))*K_f(-t)]^2 \qquad 9$$

where * denotes a convolution operation (standard signal processing usage) and $-t$ denotes reversal of the signal in the time variable t.

Owing to the symmetry properties of $k_f(t)$ and antisymmetry of $k_o(t)$ it is evident that $$k_o(-t)=-k_o(t)$$

$$k_f(-t)=k_f(t) \qquad 10$$

and one can write $$A^2(t)+B^2(t)=\tfrac{1}{4}[-ck_o(st)*k_o(t)-dk_f(st)*k_o(t)]^2 + \tfrac{1}{4}[ck_o(st)*k_f(t)+dk_f(st)*k_f(t)]^2=\tfrac{1}{4}\{c^2([k_o(st)*k_o(t)[^2+[k_o(st)*k_f(t)]^2)+d^2([k_f(st)*k_o(t)]^2+[k_f(st)*k_f(t)]^2)\}=\tfrac{1}{4}\{[k_o(st)*K_o(t)]^2+[k_o(st)*k_f(t)]^2\}$$

or $$=\tfrac{1}{4}\{[k_f(st)*k_o(t)]^2+[k_f(st)*k_f(t)]^2\} \qquad 11$$

which follows along the processing sequence through 5E and which has made use of a number of unstated assumptions and extended properties of $k_o(t)$, $k_f(t)$. These latter points will now be briefly discussed.

The result of the convolution of two functions both having either a point of symmetry or antisymmetry is a function which has a point of symmetry. Similarly, if one function has a point of symmetry while the other has a point of antisymmetry, the result will have a point of antisymmetry. If we perform Fourier analyses, using as a coordinate origin these points of symmetry and antisymmetry, the phase spectrum of the resulting transform must either be identically zero, $\pm\pi$ or else equal to $\pi/2$ sgn(w).

From the well-known convolution theorem, three results can be derived. First, if we scale a time variable by a constant s, we scale the frequency domain variable by 1/s. In mathematical terms, $$g(st);G(w/s) \quad 12$$

are time and frequency domain equivalents. Convolution in the time domain is equivalent to multiplication in the frequency domain. Hence, $$f(t)*g(t);F(w)G(w) \quad 13$$

are time and frequency domain equivalents. In polar form, the product F(w)G(w) is equivalent to a multiplication of the respective amplitude spectra and a simple ordered difference of the phase spectra. Finally, the time and frequency domain equivalents of reversal in time are as follows:

$$g(-t);G^{+}(w) \quad 14$$

where + denotes complex conjugation or simply the reversal in sign of the Phase Spectrum.

Figure 14:
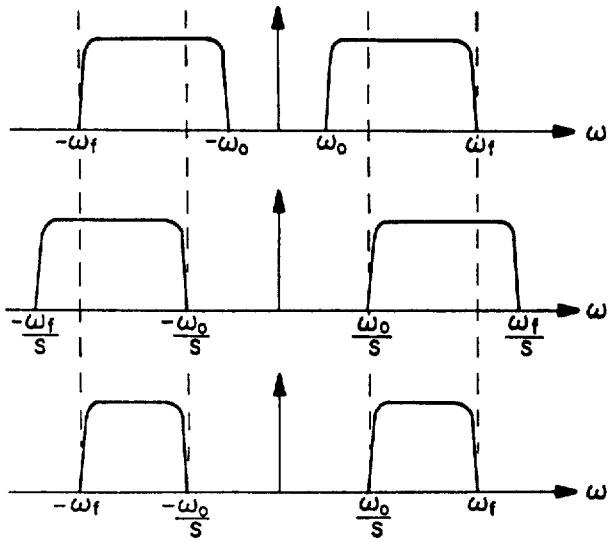
FIG. 14 shows the graphical evaluation of the amplitude spectrum of a cross-correlation in the Fourier frequency domain between a detection signal pair and a propagating signal which has been Doppler distorted.

With the three results 12, 13 and 14, we return to Equation 11 where we note that they have been used to eliminate cross-product terms having the coefficient cd. Also we recognize that $$k_o(st)*k_o(t)=k_f(st)*k_f(t) \quad 15$$

which is in fact yet another Klauder Signal of slightly different frequency content with a point of even symmetry, which we shall call $k_i'(t)$. We can readily appreciate the make-up of $k_i'(t)$ by examining FIG. 14 which is a graphical evaluation of the convolution of Equation 15 for an approaching target performed in the Fourier frequency domain.

Using analogous reasoning we find also that $$k_o(st)*k_f(t)=-K_f(st)*k_o(t) \quad 16$$

which is the antisymmetric counterpart of $k_i'(t)$ and shall herein be called $k_o'(t)$. We shall now state as a general principle that any signal base pair having Properties, I, II and III, thereabove, and further exhibiting respectively antisymmetry and a symmetry characteristic will have a sum of squares which is sharply peaked about the respective point of symmetry and coincident point of antisymmetry. This property holds for all Klauder Signals 2B including.

$$k_o(t),\ k_f(t)$$

$$k_o(st),\ k_f(st)$$

$$k_o'(t),\ k_i'(t) \quad 17$$

and all Gabor Signals 2C. Before presenting some analysis which suggests the validity of this general principle, we should note that equation 11 may be rewritten as $$A^2(t)+B^2(t)=\tfrac{1}{4}\{[k_o'(t)]^2+8\ k_i'(t)]^2\} \quad 18$$

$k_o'(t)$ and $k_i'(t)$ as functions with coincident points of antisymmetry and symmetry must have Fourier series representations of the form $$k'_o(t) \approx \sum_{i=0}^{\infty} h_i \sin w_i t \quad 19$$

$$k'_f(t) \approx \sum_{i=0}^{\infty} h_i \cos w_i t$$

The sum of the squares of equation 18 is then simply $$[k'_o(t)]^2 + [k'_f(t)]^2 = \sum_{i=o}^{\infty}\sum_{j=o}^{\infty} h_i h_j \sin w_i t \sin w_j t + \sum_{i=o}^{\infty}\sum_{j=o}^{\infty} h_i h_j \cos w_i t \cos w_j t = \sum_{i=o}^{\infty}\sum_{j=o}^{\infty} h_i h_j \cos (w_i - w_j)t \quad 20$$

Since the common amplitude spectrum F(w) of $k_o'(t)$ and $k_i'(t)$ is smooth and unimodal, we can take all the $h_i$ which are nonzero to be approximately equal. This allows us to recognize that equation 20 has a maximum at t=0 where all the cosine harmonics are in phase. We also recognize that equation 20 is symmetrical about t=0.

An analysis of $f_f(s(t-\alpha/2-\tau)-T)$, the second member signal of the echo train described by equation 8 through the processing sequence of FIG. 2 would parallel the considerations of equations 9 through 20. Hence the net effect of the processing sequency of FIG. 2 on the echo 3A described mathematically for the particular example by equation 8 is to identify two well-defined correlation peaks of mathematical form of equation 18 which occur at times.

$$st=T+s\alpha/2$$

$$st=T+s\alpha/2+s\tau \quad 21$$

in the correlated variable time scale.

The interval between the peaks is simply $s\tau$ and since $\tau$ is known, s can be determined thus providing the estimate of the target relative velocity. Once s is known, the target range may be computed from T and a knowledge of the velocity V of the signal 1A in the propagation medium 2 (FIG. 1).

Figure 15:
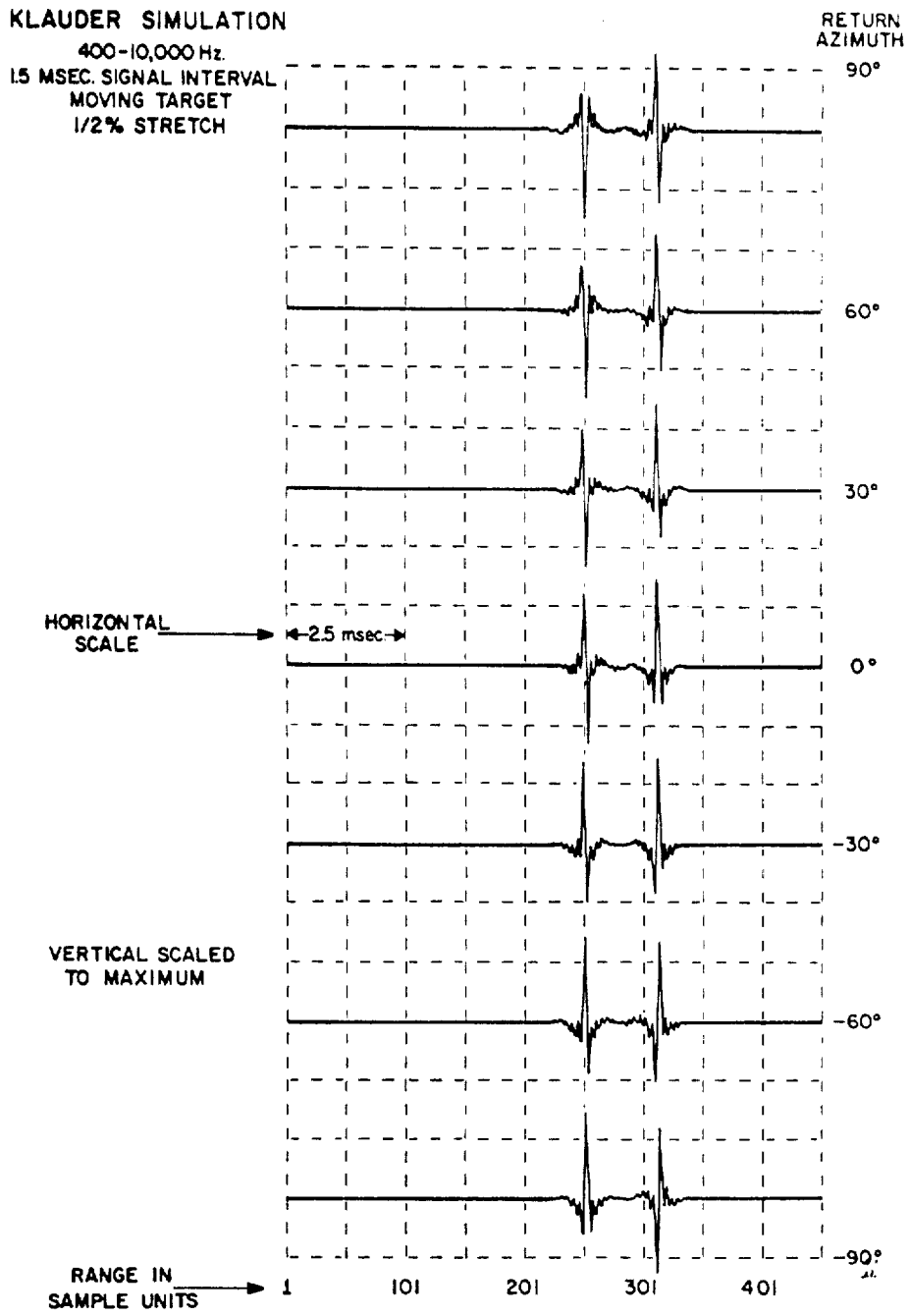
FIG. 15 shows a computer simulation of the phase encoding of angular information in a two member signal train.
Figure 16:
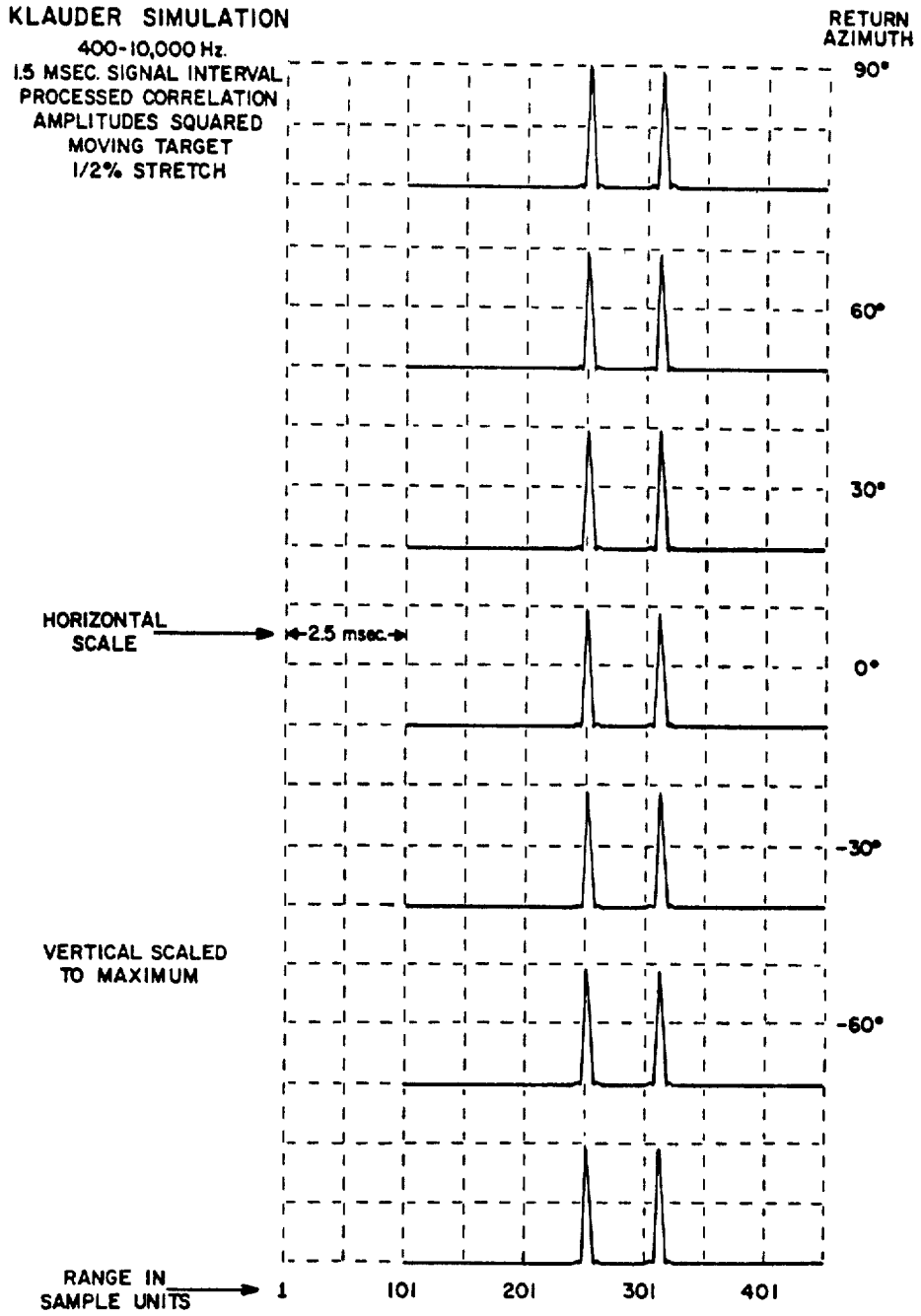
FIG. 16 shows a simulated development of a correlation amplitude function for the signal train with phase encoded angular information.

FIGS. 15 and 16 further illustrate the technique through the results of a digital computer simulation. In FIG. 15 we observe seven returning two-member Klauder echo signal trains of the mathematical form of equation 8. The various trains correspond to differing choices of the constants c, d, a, b as they are defined by equations 5 and 6. For the particular illustration $$w_o=800\pi$$

$$w_f=20{,}000\pi$$

$$s=1.005$$

$$\pi=0.0015 \text{ sec.} \quad 22$$

note that the signal echo train identified by "Return Azimuth" 0° is in fact of the form illustrated by FIG. 13. Results of the processing sequencer of FIG. 2 are shown in FIG. 16. The interval between the peaks is simply $s\tau$ in all cases and it can easily be determined as described.

Application of the technique using signals like the chirps of equation 2A are similar, but require somewhat more subtlety in their explanation. It is well-known that the cross- and auto-correlation signatures of the chirp signals 2A in the absence of any stretching or compression are in fact to a good approximation the Klauder Signals 2B. While this is well-known, we illustrate this point again by computer simulation. The bottom curve of FIG. 17 is in fact the auto-correlation of a sinusoidal chirp or sweep where $w_o = 20\pi$ $w_f = 80\pi$ $\alpha = 7$ sec.

Sample Interval = 0.004 sec. 23

The cross-correlations of the undeformed sweep with stretched versions of itself are also shown.

Figure 17:
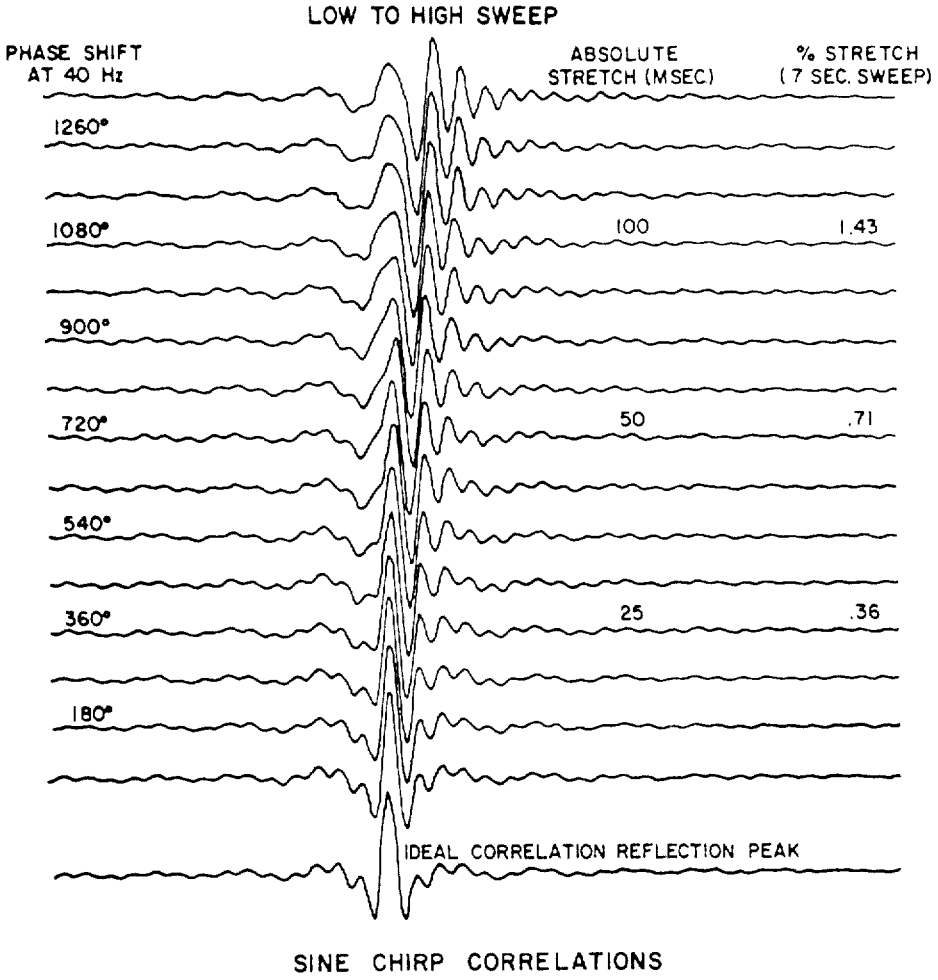
FIG. 17 shows a sequence of cross-correlations of a sine chirp with Doppler distortions of its original forms.

It is believed that the processing sequence of FIG. 2 when applied to the deformed echo chirps will nevertheless produce a result as in FIG. 17 with easily identifiable major peaks. As before, the two peaks would have similar form and be separated by an interval $s\tau$. There now will be, however, a correction to be made to the peak arrival times which depends on the computed value of s prior to any estimation of the target range. The nature of the correction and its variation with s may be determined by calibration studies using correlations as illustrated in FIG. 17.

As a final note, we emphasize that additional member signals in the outgoing train will provide redundant information about the target relative velocity and range which will enable the echo location technique to function even in noisy environments.

Figure 3:
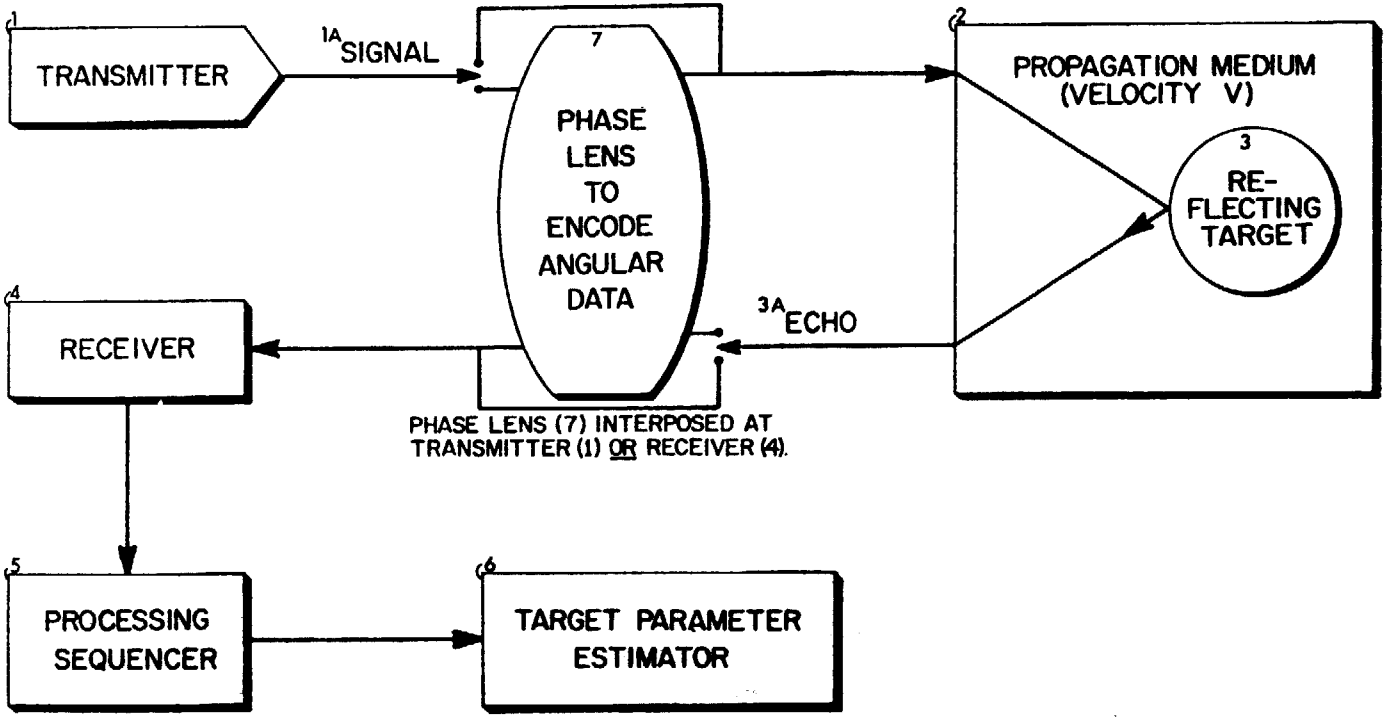
FIG. 3 shows another embodiment in which a single phase lens encodes angular information about targets.

FIG. 3 shows another embodiment of the invention. The major difference between the embodiments of FIGS. 1 and 3 in terms of physical elements is the interposition of a phase lens 7 somewhere in the signal path from the transmitter 1 to the reflecting target 3 to the receiver 4. We term the lens a "phase lens" since its primary purpose is to introduce into the propagating signal train a phase distortion which varies in a known and single valued manner with certain desired angular information. The outgoing signal 1A will now be designed in such a manner that after the received echo 3A passes through the processing sequencer 5, outlined in some detail in FIG. 4, recoverable target parameters will include range and relative velocity as in the embodiment of FIG. 1, as well as the angular information which may, for example, relate to the target azimuth or bearing.

Again the transmitter 1 emits a signal train 1A with at least two members. The signal may encounter the phase lens 7 at this time or else intercept it prior to detection by the receiver 4. A reflecting target 3 as before is imbedded in the propagation medium. The principal difference in design of members of the signal train for the application in FIG. 3 and the one in FIG. 1 is that we now require a fourth property in that $f_o(t)$, $f_f(t)$ must have properties of antisymmetry and symmetry respectively or be "odd" or "even" respectively about the points of antisymmetry or symmetry.

Formally stated, the fourth property is

IV. $f_o(t)$ and $f_f(t)$ must be odd (or antisymmetric) and even (symmetric) respectively about the central coordinate value in their interval of definition of duration $\alpha$.

Let us for the moment assume that the phase lens 7 introduces a constant phase shift $\theta$ independent of w which varies only as described with the desired angular information. We shall describe the operation of the processing sequencer 5 of FIG. 3 for this circumstance and then indicate those modifications which would be required for more complex phase shifts. Recall the signal train 7 and its manner of definition from Klauder signals 2B and the constants c, d, a, b according to equations 5 and 6. We shall use such a signal train or one designed analogously from Gabor signals 2C with the following modification $$a = \sin\theta$$
$$b = \cos\theta$$
$$c = \cos\theta$$
$$d = -\sin\theta$$
$$\theta = \text{constant} \qquad 24$$

Note that owing to property IV, the chirp signals 2A are disqualified from direct use in this technique.

Let us consider $f_k(t)$ and $f_f(t)$ (equation 5) individually for the moment and their Fourier frequency domain equivalents. In the Fourier frequency domain:

$$F_k(w) = \int_{-\infty}^{\infty} f_k(t)e^{-iwt}\,dt = b\int_{-\infty}^{\infty} f_o(t)e^{-iwt}\,dt - a\int_{-\infty}^{\infty} f_f(t)e^{-iwt}\,dt \qquad 25$$

$$= bF_o(w) - aF_1(w) = (+ib - a)F(w)$$

$$= \mp i(b \mp ai)F(w) = F(w)e^{\mp(h+w/2)}$$

$$F_f(w) = aF_o(w) + bF_1(w) = (\mp ia + b)F(w)$$

$$= F(w)e^{\mp k}$$

In equation 25, F(w) is the common amplitude spectrum (Property I), $\pm$ is a shorthand notation for $-\mathrm{sgn}(w)$, and equations 24 have been applied. The properties of $f_k(t)$ and $f_f(t)$ in the complex Fourier frequency domain are much like those of $f_o(t)$, $f_f(t)$ except that a constant phase angle $\theta$ has been introduced into each frequency component.

In fact, a phase lens 7 able to introduce phase distortions independent of w would convert the wave train 4 into the form of the wave train 7. If now this phase distortion were diagnostic of the desired angular information, then recovery of it would be tantamount to recovery of the angular information. Assuming such a phase lens 7, we now change our notation for the propagating signal train 7 to $$f_k(t-\alpha/2,\theta) + f_f(t-\alpha/2-\tau,\theta) \qquad 26$$

to give expression to the variation of the train with the desired angular information. The received echo (3A and 4) can correspondingly be expressed as $$f_k(s(t-\alpha/2)-T,\theta) + f_f(s(t-\alpha/2-\pi)-T,\theta) \qquad 27$$

—refer to equation 8. It is important to recognize that $\theta$ is unaffected by the Doppler effects owing to the special properties of our signals.

Figure 4:
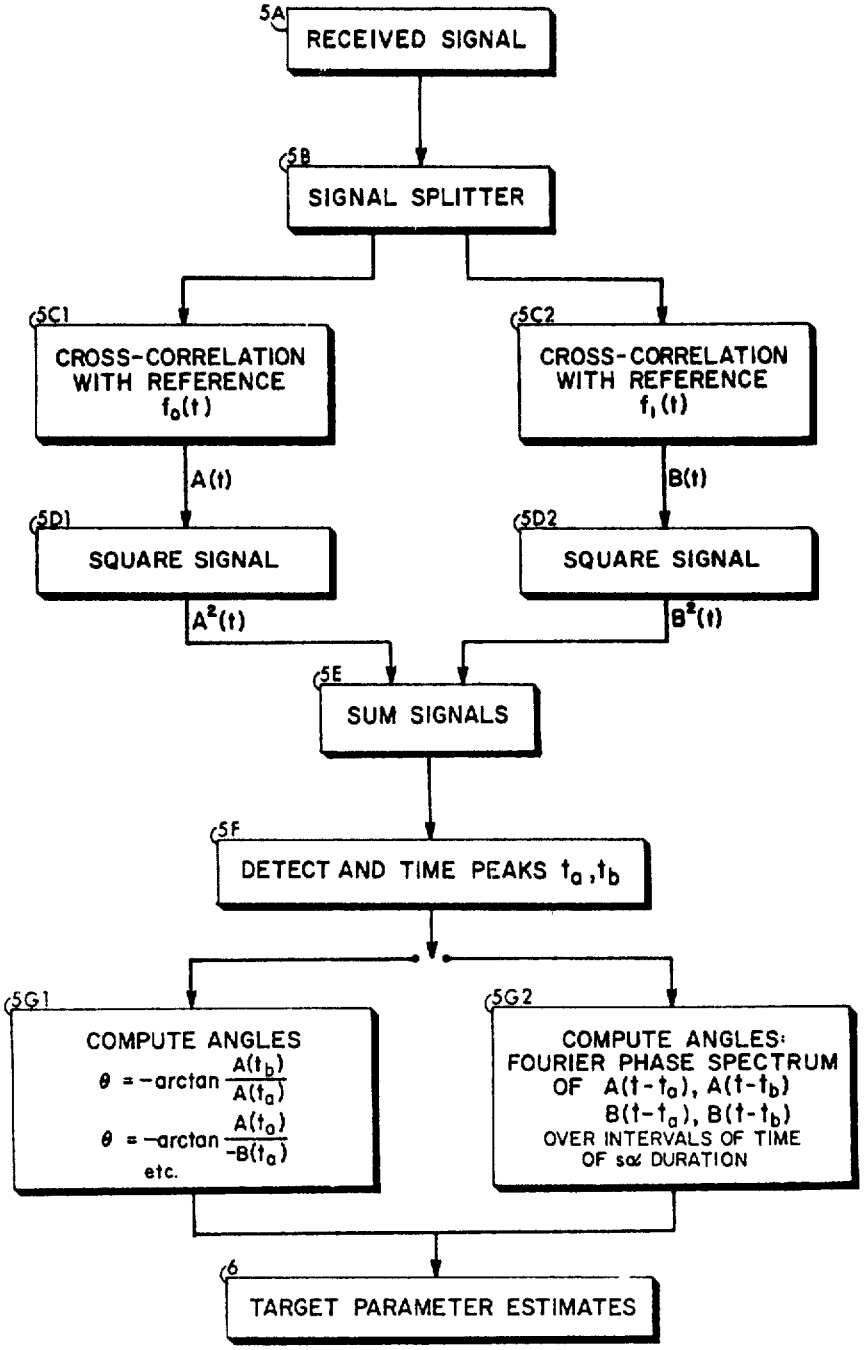
FIG. 4 shows a processing sequence for the embodiment of FIG. 3.

For an understanding of the essentials of processing of FIG. 4, it will be more convenient to look at the mathematical analyses entirely in terms of their Fourier frequency domain equivalents. To facilitate comprehension, we refer to the results of equations 12, 13, 14, 25 and FIG. 14.

In the Fourier frequency domain, the received signal 5A is simply $$F(w/s)e^{\mp i\theta}e^{\mp iw/s\ T/s}\{e^{\mp i(w/s\ \alpha/2+\pi/2)}+e^{\mp i(w/s[\alpha/2+\pi])}\} \quad 28$$

The signal splitting operation 5B simply requires division of equation 28 by 2. The cross-correlations 5C1 and 5C2 simply require that the halved components of equation 28 be multiplied respectively by $F_o^+(w)$ and $F_1^+(w)$. Evaluation of the amplitude portion of the convolutions proceeds analogously to the illustration of FIG. 14 and we are again led to define the signals $ff_o'(t)$ and $f_j'(t)$ analogously to $k_o'(t)$ and $k_j'(t)$ as described in the discussions surrounding equations 15 and 16. Recall that $f_o'(t)$, $f_j'(t)$ are much like $f_o(t), f_j(t)$, but span a slightly different frequency range.

In detail, and in the frequency domain, the two convolution products are simply $$A(w)=F(w)F(w/s)e^{\mp i\theta}e^{\mp iw/s\ T/s}\{e^{\mp i(w/s\ \alpha/2)}+e^{\mp i(w/s[\alpha/2+\tau]-\pi/2)}\}$$

$$B(w)=F(w)F(w/s)e^{\mp i\theta}e^{\mp i\ w/s\ T/s}e^{\mp i(w/s\ \alpha/2+\pi/2)}+e^{\mp i(w/s[\alpha/2+\pi])}\}$$

Now making use of the signal pair $f_o'(t)$, $f_j'(t)$ we can write explicitly the time domain equivalents of the expressions of equation 29 or $$A(t)=\tfrac{1}{2}T^{-1}\{F(w)F(w/s)e^{\mp iw/s\ T/s}[\cos\theta\ e^{\mp i(w/s\ \alpha/2)}+\sin\theta\ e^{\mp i(w/s\ \alpha/2+\pi/2)}+\cos\theta\ e^{\mp i(w/s[\alpha/2+\tau]-\pi/2)}+\sin\theta\ e^{\mp i(w/s[\alpha/2+\tau])}]\}=\tfrac{1}{2}(bf_j'(s(t-\alpha/2)-T)+af_o'(s(t-\alpha/2)-T)-bf_o'(s(t-\alpha/2-\tau)-T)+af_j'(s(t-\alpha/2-\tau)-T),$$
$$=\tfrac{1}{2}(f_j'(s(t-\alpha/2)-T,\theta)-f_k'(s(t-\alpha/2-\tau)-T,\theta)),$$

$$B(t)=\tfrac{1}{2}T^{-1}\{F(w)F(w/s)e^{\mp iw/s\ T/s}[\cos\theta\ e^{\mp i(w/s\ \alpha/2+\pi/2)}-\sin\theta\ e^{\mp i(w/s\ \alpha/2)}+\cos\theta\ e^{\mp i(w/s[\alpha/2+\tau])}+\sin\theta\ e^{\mp i(w/s[\alpha/2+\tau]+\pi/2)}]\}=\tfrac{1}{2}(f_k'(s(t=\alpha/2)-T,\theta)+f_j'(s(t-\alpha/2-\tau)-T,\theta)).$$

In deriving the results of equation 30, we have defined (and employed) the signal pair $f_k'(t,\theta)$, $f_j'(t,\theta)$ in a manner analogous to the definitions implied by equations 26 and 27. Also, the notation $T^{-1}\{\}$ denotes the operation of an inverse Fourier transform.

At this point, following the sequence of FIG. 4, we must take A(t) and B(t), the two expressions of Equation 30, square them (5D1 and 5D2) and add them (5E). Note that owing to a sign difference no "cross-terms" of the form $f_k'(t,\theta)\ f_j'(t,\theta)$ appear. We are left simply with the quantity $$A^2(t)+B^2(t)=\tfrac{1}{4}\{f_k'^2(s(t-\alpha/2)-T,\theta)+f_j'^2(s(t-\alpha a-/2)-T,\theta+f_k'^2(s(t-\alpha/2-\tau)-T,\theta)+f_j'^2(s(t-\alpha/2-\tau)-T,\theta)\} \quad 31$$

Before interpreting the significance of equation 31, it is desirable to comment on the nature of the expression which has the form $$f_k'^2(t,\theta)+f_j'^2(t,\theta) \quad 32$$

Recalling all of the arguments of similar nature surrounding the understanding of equation 11, and in specific the results developed through equations 18, 19 and 20, we recognize that equation 31 will have well defined maxima at times.

$$st=T+s\alpha/2$$

$$st=T+s\alpha/2+s\tau \quad 33$$

We can now determine the target relative velocity and range precisely as in the application of FIG. 1. Before we consider some alternate methods of recovery of the target angular information 5G1 and 5G2, it is instructive to refer back to FIG. 15 where we now recognize a family of two member signal trains with encoded values of $\theta$ ranging from 90° to −90° in 30° increments. Note that the computer simulation of the sequence of FIG. 4 through 5F (Equation 33) shows that the detected peak interval is for practical purposes independent of the encoded phase information.

We shall now consider some methods of recovery of $\theta$ or equivalently the target angular information by the alternate 5G1 of FIG. 4. On the stretched time scale of equation 31 consider the arctangent of the ratio of ordinate values of the return signal (equation 27) at the two particular time values corresponding to the correlation maxima. In detail, $$\text{Phase Angle}=\arctan Z$$

where $$Z=\frac{\{\cos\theta\ f_o(s(t-a/2)-T)-\sin\theta\ f_1(s(t-a/2)-T)\}_{s1-T+sa/2}}{\{\sin\theta\ f_o(s(t-a/2-\tau)-T)+\cos\theta\ f_1(s(t-a/2-\tau)-T)\}_{s1\mp T+sa/2-\pi}}$$

$$\text{Phase Angle}=\arctan\{-\sin\theta/\cos\theta\}=\arctan\{-\tan\theta\}=-\theta \quad 34$$

To derive the result of equation 34 we have used the definitions of equation 5 and property IV or $f_o(O)=0$ and $f_1(O)=1$. Analogous reasoning allows additional computations of $\theta$ using the correlation components A(t), B(t) certain of which are illustrated in FIG. 4 as 5G1.

The alternate 5G2 of FIG. 4 for determining $\theta$ or the target angular information is also readily accomplished. Using the peak positions determined by 5F (equation 33) as coordinate origins, Fourier transforms of the correlated member signals of the trains A(t), B(t), or the returning echo train itself may be computed and the phase spectra computed. Over the band of frequencies encompassed by f(w) (property I), the phase sepctrum will be constant and equal to $\pm\theta$ or $\pm\theta\ \pm\pi/2$. We illustrate this point again by computer simulation.

Figure 18:
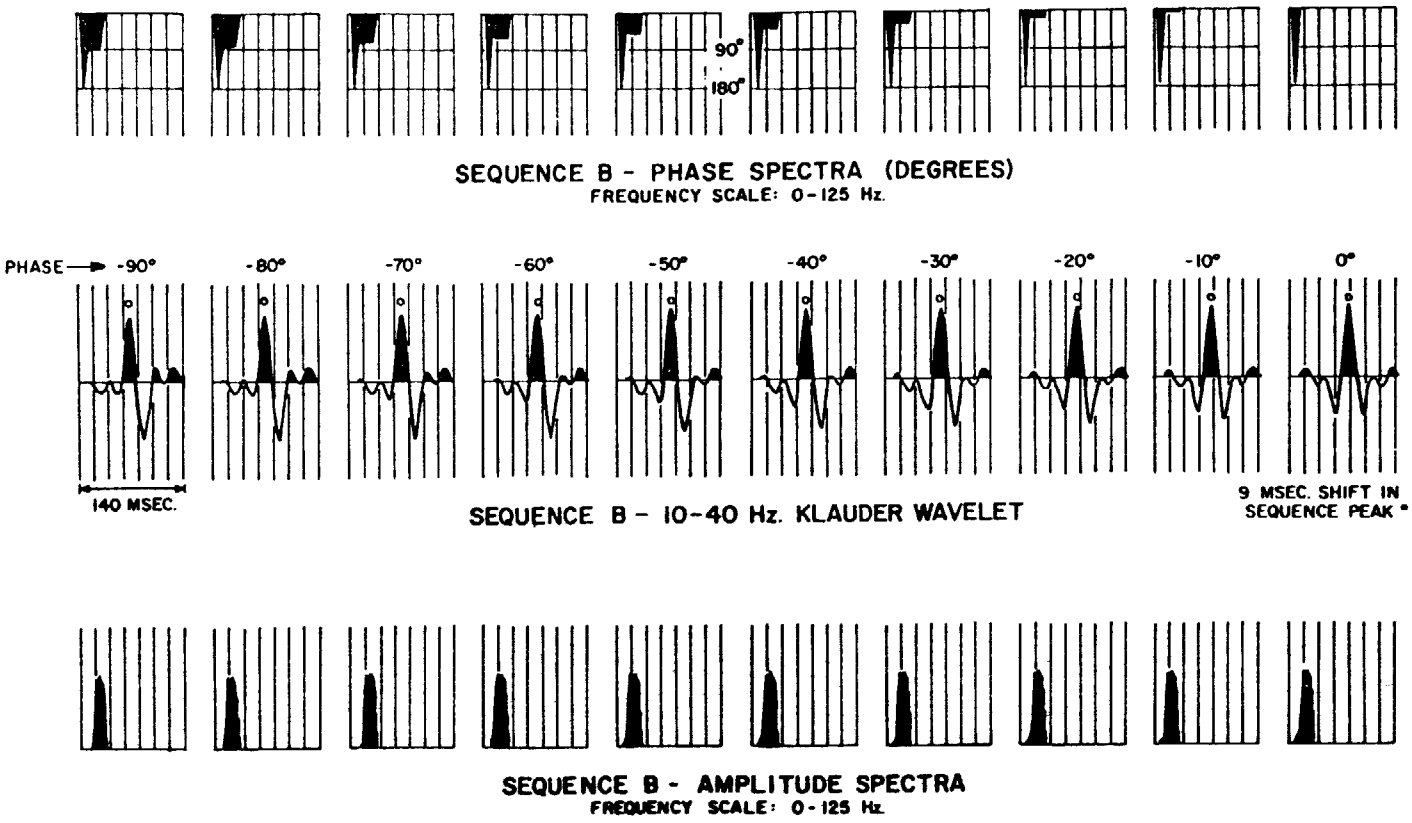
FIG. 18 shows the computation of phase and amplitude spectra of member signals carrying phase-encoded angular information.

FIG. 18 illustrates a nine member returning signal train in which $\theta$ is successively encoded at 10° increments from −90° to 0°. Note that sign convention used here is the opposite of the one used in FIG. 15. An amplitude and phase spectrum was computed for each member signal using as the coordinate origin the peak indicated by processing according to FIG. 4 up through element 5F. The train is denoted by Sequence B and it is readily observed that the amplitude spectra are identical as they should be. For the meaningful frequency band defined by the amplitude spectrum we see that the phase spectrum is in fact constant and equal in value to $\theta$.

We now address the question of the introduction by the phase lens 7 of FIG. 3, phase variations which vary with the target angular information but which are not independent of the frequency. It should be noted, however, that for restricted frequency bands the approximation $$\theta(w)=\theta_o+\theta_l w \text{ where } \theta_o, \theta_l \text{ are constants} \quad 35$$

may be expected to reasonably represent phase effects. The linear variation of phase with frequency inherent in equation 35 and governed by $\theta_l$ necessarily implies that some timing adjustment depending on $\theta_l$ will be needed which will change the target range computation. Target relative velocity will be unchanged as all member signals undergo the same phase distortion for any given value of the target angular information hence suffering also the same delays.

To illustrate the previous discussion we note that substituting $\theta(w)$ for $\theta$ in equation 25 would give in the time domain in place of equation 26

$$f_k(t-\alpha/2-T-\theta_l, \theta_o)+f_j(t-\alpha/2-T-\theta_l, \theta_o) \quad 35A$$

The received echo (3A and 4) would be correspondingly modified. If the desired angular information is functionally related to $\theta(w)$ then it is similarly related to $\theta_o$, $\theta_l$ through equation 35.

Referring to FIG. 4 in this circumstance, it is evident that the alternate computation for $\theta$, 5G1 will yield a single characteristic $\theta_o$ value which can uniquely be related to the desired target angular information for reasonably behaved phase lenses 7 as described by empirical procedures which make use of reflecting targets of known parameters. The same calibration procedures can be used to relate $\theta_l$ to the measured $\theta_o$ so that the echo timing correction can be made. Of course, alternate 5G2 will similarly allow a direct estimation of $\theta_o$, and $\theta_l$ may then be related to $\theta_o$ by empirical calibrations. $\theta_l$ is again directly interpretable as the timing correction needed for determining the target range, and $\theta_o$ and $\theta_l$ are now both available to define the approximation to $\theta(w)$ thus allowing as before determination of the target angular information.

Figure 5:
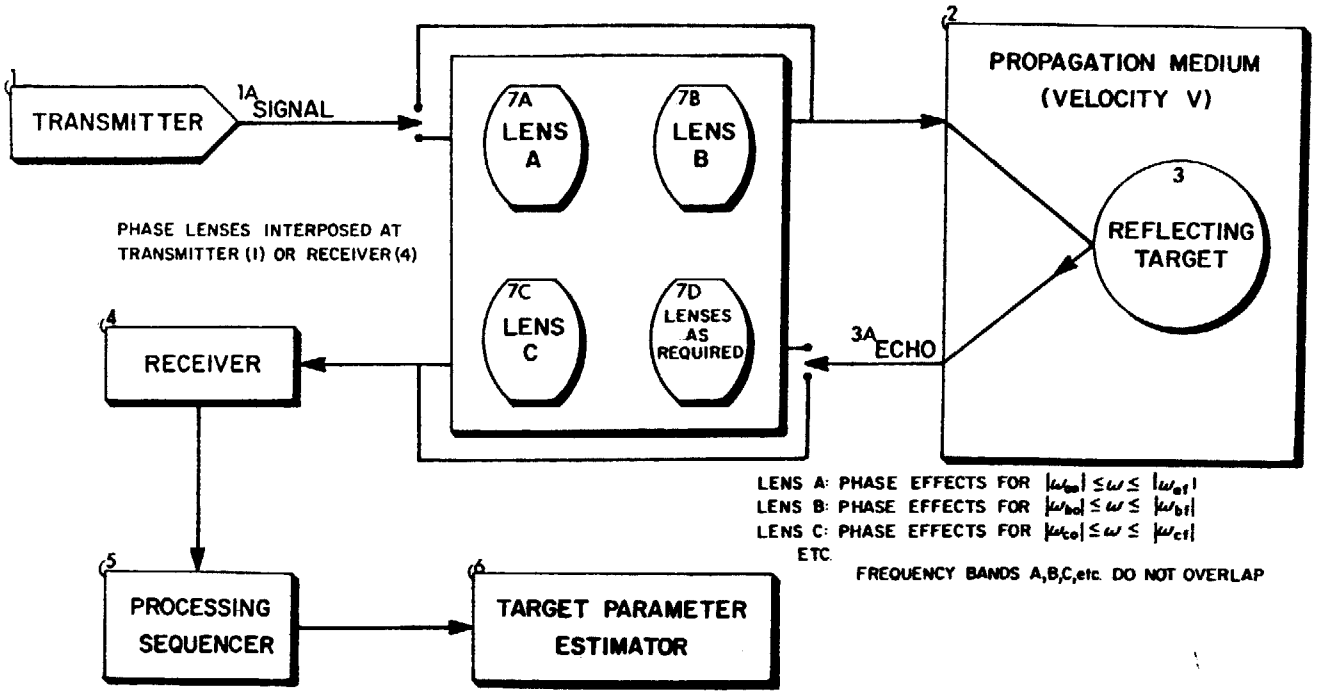
FIG. 5 shows another embodiment utilizing a number of mutually exclusive signal trains from the transmitter, one phase lens being interposed for each signal train.

Yet another embodiment of the invention similar to that illustrated in FIG. 3 is indicated in FIG. 5. Here a reflecting target 3 is identified in terms of its relative velocity, range and angular information in more than one angle as perhaps the bearing and elevation angle. The technique uses a number of the embodiments of the type of FIG. 3 in concert, each realization of the former technique occupying different but non-overlapping bands of frequency or polarization (if applicable). The signal bands are selected to retain their exclusion in polarization and/or frequency despite all Doppler effects and effects introduced by the propagation medium 2 or reflecting target 3. Angular information is encoded in each signal band or polarization direction by an appropriate phase lens as in FIG. 3 except that the lenses may affect only certain of the signal bands or polarizations, and different angular information may be encoded in the different bands.

FIG. 5 illustrates the technique in terms of a number of different frequency bands, but it should be understood that mutual exclusion may still be achieved within a single band if differing directions of polarization are employed. In this case, separation of the signal bands is accomplished by filtering according to polarization first.

The transmitter 1 of FIG. 5 emits the coincident signal trains as described which may have any relative alignment in time including simultaneity. Prior to encountering the receiver 4 a series of phase lenses 7A, 7B, 7C, etc. are interposed or some other mechanism employed which encodes desired angular information as a phase distortion in the manner previously described. The lenses 7A, 7B, 7C, etc. or equivalent mechanisms act independently upon the differing signal bands so that differing angular information may be encoded in each of them. Encoding of the same information in differing bands would, of course, provide redundancy and improved recovery of such information noisy environments.

Figure 6:
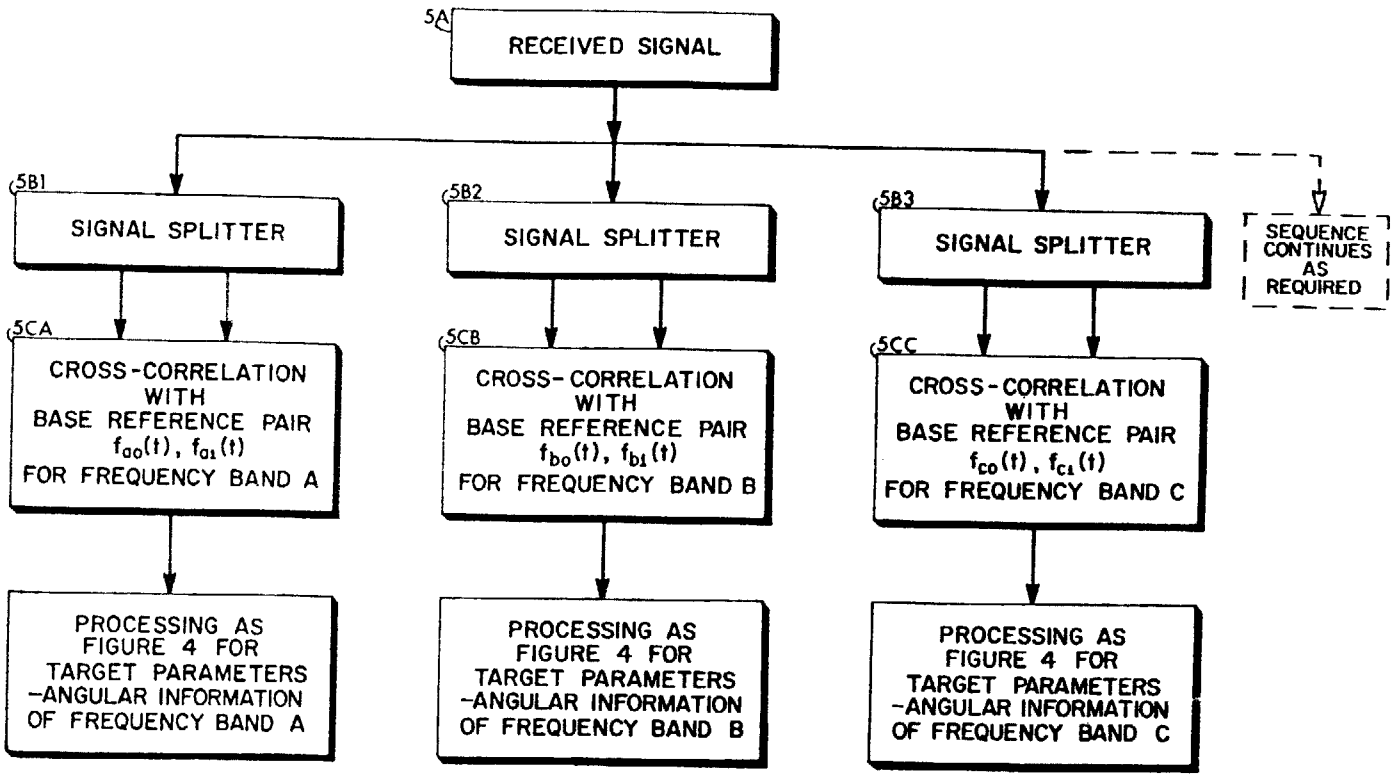
FIG. 6 shows a processing sequence for the embodiment shown in FIG. 5.

The propagation medium 2 and reflecting target 3 function analogously to their respective roles in FIG. 3. The processing sequence 5 functions much as in FIG. 3 but in parallel for each signal band. FIG. 6 diagramatically illustrates the parallel processing for the configuration outlined by FIG. 5. The target parameter estimator 6 might encompass certain added features to allow for the effective use of redundant information about target range and relative velocity.

We can readily appreciate that polarization filtering (if applicable) or the cross-correlation operations 5CA, 5CB, 5CC, etc. of FIG. 6 do in fact achive a separation of the signal bands. For example, each such operation develops correlation components analogous to A(t), B(t) of FIG. 4 (also Equation 30). Equation 29 shows the counterpart Fourier transforms A(w), B(w) in polar form. If the amplitude spectrum of the received return signal does not overlap that of the base function pair of the cross-correlation 5CA, 5CB, 5CC, etc., no output whatsoever will result. Hence the coincident signal bands do not interfere and may be treated quite independently.

Figure 7:
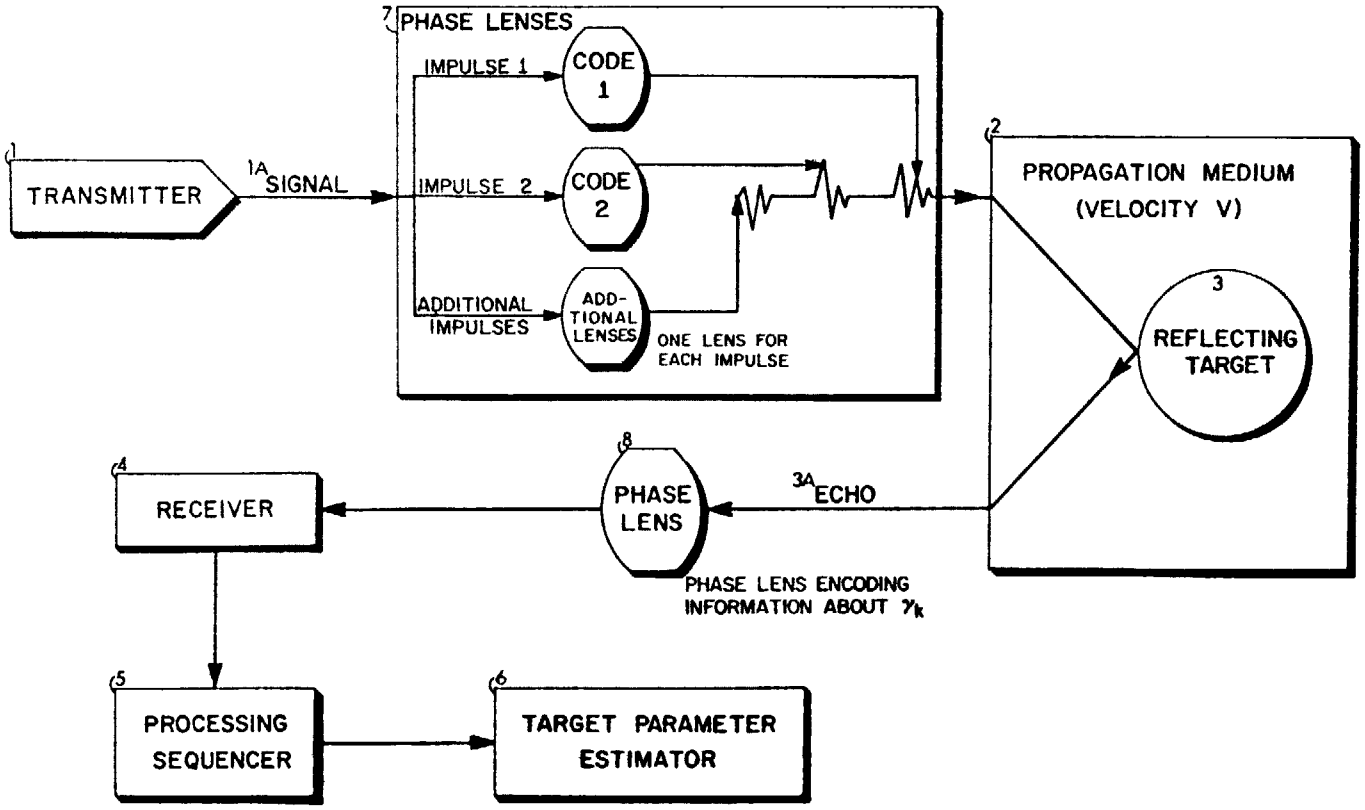
FIG. 7 shows another embodiment having different phase encodings of angular information for each member signal of a single outgoing signal train.

FIG. 7 illustrates another embodiment of the invention which is like the embodiment of FIG. 5 in that the reflecting target 3 is again identified in terms of its relative velocity, range, and angular information in more than one angle as perhaps the bearing and elevation angle. Unlike the embodiment of FIG. 5 which utilizes simultaneously many signal bands, the angular information in this approach is phase encoded differently in the various member signals of the outgoing signal train 1A. The transmitter in this instance functions as in FIG. 3 utilizing only a single signal band defined as having uniform polarization (if applicable) with impulsive member signals of four properties as described having a frequency content limited to $w_0 \leqq |w| \leqq w_f$.

One possible mechanism for accomplishing the diverse phase encodings is shown in FIG. 7 where differing phase lenses 7 are interposed in turn between the transmitter 1 and the reflecting target 3 such that each member signal of the outgoing signal train 1A encounters a different lens. If information is desired about two angles, at least two such lenses are required. Additional angles would require additional lenses and at least an equivalent number of member signals in the outgoing train.

Let each phase encoding be characterized by a single phase value $\theta_i$ recognizing that as in preceding discussions the characterization can be generalized to accommodate more realistic encodings of general linear form. We shall now assume that the desired angular information $\psi_j$ is related to $\theta_i$ by the known or empirically determined relation $$\theta_i=g_i(\psi_j) \quad 36$$

where i denotes the member signal of the train and j denotes the particular angular information in a plane j containing the transmitter 1 and referred to a line in this plane.

For a more concrete discussion, we shall consider the specific case in which there are only two outgoing member signals, $=1,2$ and one value of $\psi_j$ or $\psi_l$. $g_1$ and $g_2$ shall be defined as implied by the equations $$g_1=\psi_1$$

$$g_2=-\psi_1 \qquad 37$$

We may now similarly interpose other phase lenses 8 between echo 3A from reflecting target 3 and receiver 4. One such lens is depicted in FIG. 7. As before, the single value of phase $\phi_i$ will characterize the encoding, where i again refers to the member signals, but now of the echo train 3A. The $\phi_i$ are related to the desired angular information referred to a specified line in a plane k through the receiver 4 by the known or empirically determined relation $$\phi_i=h_i(\gamma_k) \qquad 38$$

Again, for illustrative purposes and with no loss of generality, we shall assume a single lens 8, a single desired angle $\gamma_1$ such that for the two returning member signals, the phase encoding by the lens 8 would be $$\phi_1=\gamma_1$$

$$\phi_2=\gamma_1 \qquad 39$$

where $h_1$, $h_2$ have implicit definition in equations 39. It is important to add that for each desired angle beyond the first, either $g_i(\psi_j)$ or $h_i(\gamma_k)$ for member signal i must have a single value form more general than the simple addition of a constant value.

Figure 8:
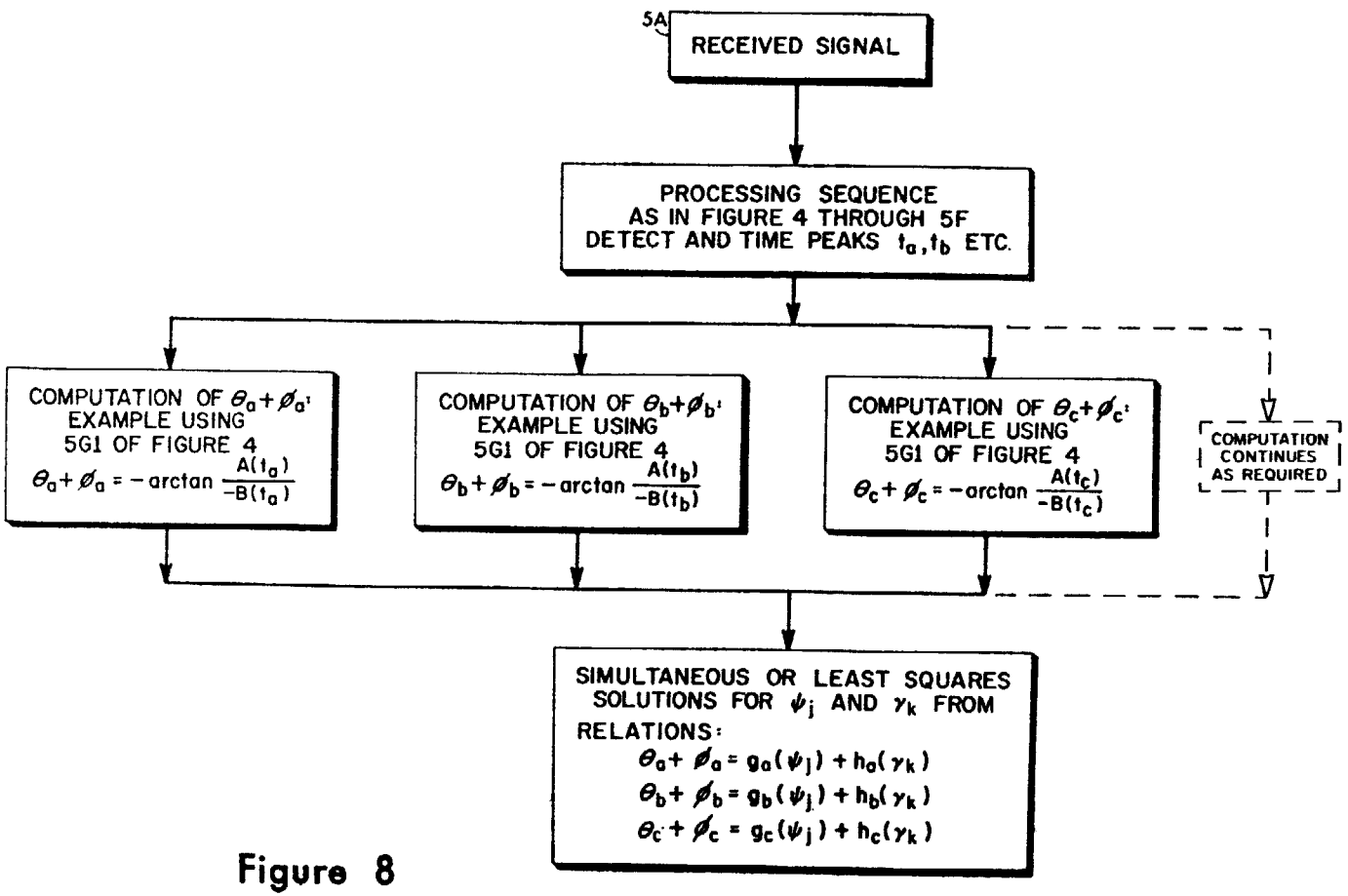
FIG. 8 shows a processing sequence for the embodiment of FIG. 7.

The processing sequence 5 described in greater detail in FIG. 8 is analogous to the sequence of FIG. 4 through element 5F of that FIG. where the timing of peaks in the correlation component square sum leads to estimates of the target relative velocity and range. FIG. 8 illustrates alternate 5G1 of FIG. 4 being employed to estimate the phase characteristic for each member signal. Referring to equations 36 and 37 these are given generally by $$\theta_i+\phi_i=g_i(\psi_j)+h_i(\gamma_k) \qquad 40$$

which are a set of i simultaneous equations for $j+k$ unknowns. The unknown $\psi_j$ and $\gamma_k$ constitute the desired angular information and may be determined when $i \geqq j+k$.

In the simplified case cited for illustration in equations 37 and 39, the counterparts to equations 40 are $$\theta_i+\phi_1=\psi_1+\gamma_1$$

$$\theta_2+\phi_2=-\psi_1+\gamma_1 \qquad 41$$

whose solution can be directly obtained as a simple sum and difference of observed phases or $$\gamma_1=\frac{\theta_1+\phi_1+\theta_2+\phi_2}{2} \qquad 42$$

-continued $$\psi_1=\frac{\theta_1+\phi_1-\theta_2-\phi_2}{2}$$

Note that the successive phase encodings imposed on the propagating signal by the cascaded phase lenses 7 and 8 are simply additive.

Where the phase distortion imparted by any lens requires a more general description such as a linear approximation as described by equation 35, the procedure is similar except that after determining the desired angular information from member signal i, a timing correction is needed leading once again to a correction to the target range and in this embodiment also to the target relative velocity. Note that in other embodiments of the invention where all member signals passed through common phase lenses, no correction was needed for the target relative velocity. The timing correction appertaining to each lens may be determined empirically as a function of phase as before using targets of known parameters. These same calibration techniques would define the relations $$\theta_i=g_i(\psi_j)$$

$$\phi_i=h_i(\gamma_k)$$

(equations 37 and 38) unless they were determined theoretically or on some other basis.

It should also be recognized that alternate 5G2 of FIG. 4 for each member signal would again provide values of $\theta_i+\phi_i$ which could be similarly employed to derive the desired angular information and to correct the target relative velocity and range should such corrections be needed.

Another embodiment of the invention which follows from the previous discussions is one which incorporates the elements exemplified by both FIGS. 5 and 7 and their complementary processing sequences illustrated by FIGS. 6 and 8. Here again, a reflecting target 3 (of FIGS. 5 or 7) would be identified in terms of its relative velocity, range and angular information in more than one angle as perhaps the bearing and elevation angle. However, the phase encoding of the desired angular information would not be the same for all member signals of the outgoing train as in FIG. 7, and, more than a single band would also be utilized, such bands being mutually exclusive even after Doppler effects, by virtue of polarization and/or frequency differences, with each band having encoded differing angular information.

One practical objective in combining the approaches of FIGS. 5 and 7 as described is to achieve even greater redundancy of all the reflecting target parameters yet without increasing the period of time which is needed to make such identifications. Details of accomplishing the processing for such identification follows precisely from both FIGS. 6 and 8.

Figure 9:
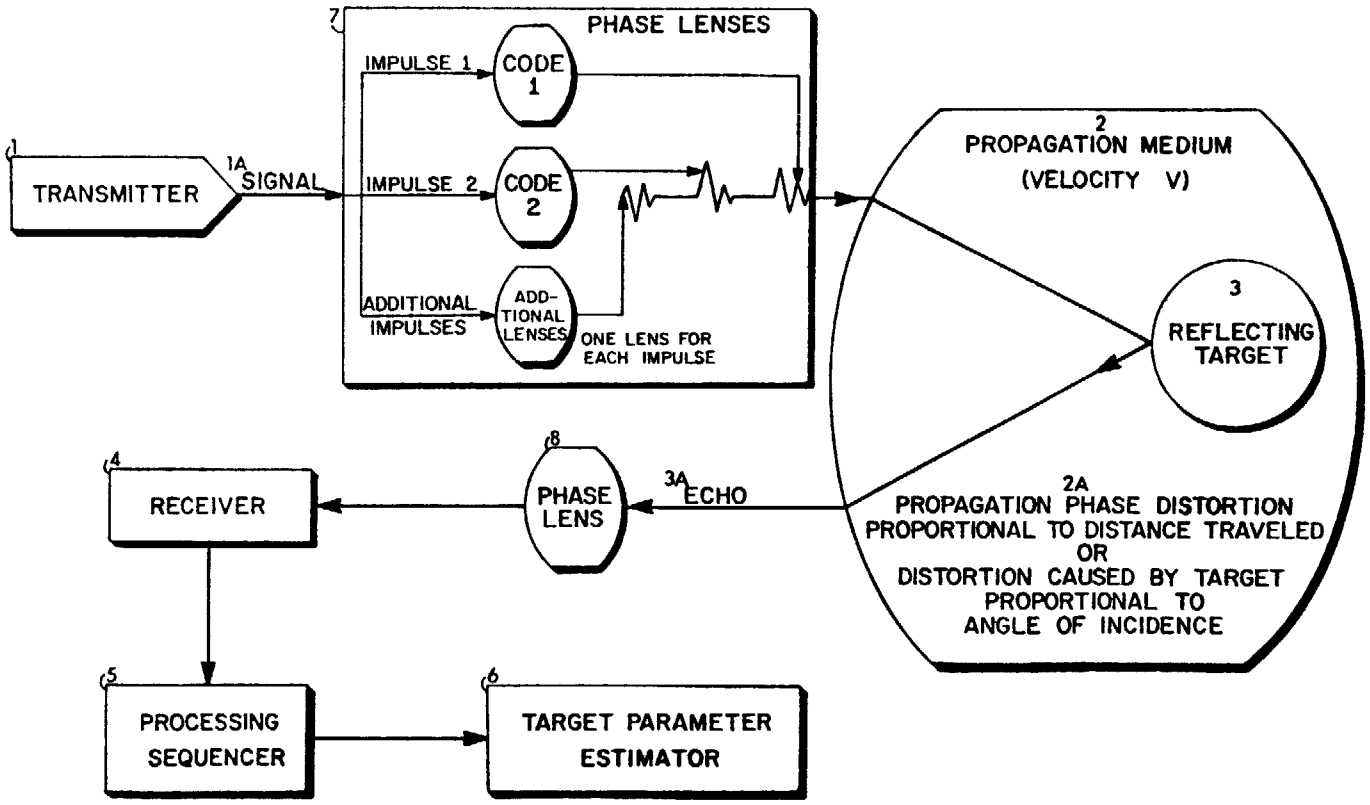
FIG. 9 shows another embodiment where the propagation phase distortion and/or the reflecting phase distortion are treated as an additional lens.

FIG. 9 depicts an embodiment of the invention much as described by FIG. 7, where again a reflecting target 3 is identified in terms of its parameters as target range, relative velocity and angular information in many angles, but now an accommodation is made also for a phase distortion 2A which is a function of the target range introduced by the propagation medium 2 and/or the reflecting target 3 as a function of the angle of signal incidence. For illustrative purposes in this discussion the phase distortion will be assumed attributable in its entirety to the propagation medium 2, with no loss of generality of the technique implied by such assumption.

For practical materials or propagation media 2, the phase distortion 2A will be smoothly varying and represented well by an analytic expression like equation 35. Such a phase distortion was specifically discussed and treated in all of the previous embodiments of the invention where angular information was to be determined. As a consequence of a distortion of this form a target range correction will result, however, no relative velocity error would be introduced since all of the member signals see the same phase distortion 2A. The constants which approximate the phase distortion in the form of equation 35 will also be estimated.

In FIG. 9, the role of the propagation medium 2 with regard to phase is analogous to the interposition of one additional phase lens 7 or 8. Unlike the phase lenses 7 or 8, the phase effects to be introduced are not designed as a part of the invention and vary with the target range or better the travel distance of the signal rather than any angular information. Let us designate the phase distortions 2A for a given value of target range R as $$\lambda(w)=\lambda_o+\lambda_1 w;\ \lambda_0=\lambda(R) \qquad 43$$

Since phase effects are additive, and if the phase distortion introduced by the phase lenses 7 and 8 have form analogous to equation 43, then for the $i^{th}$ member signal of the echo train 3A after being received 4 and processed according to the processing sequence 5 of FIG. 8, the detected phase would be $$\theta_i+\phi_i+\lambda_o=g_i(\psi_j)+h_i(\gamma_k)+\lambda(R) \qquad 44$$

where $g_i$ and $h_i$ are defined as in equations 36 and 38 and where $\lambda(R)$ is a function of the target range.

In this case $g_i$, $h_i$ and $\lambda(R)$ are all determined theoretically or else by empirical studies using a reflecting target 3 of known parameters. The equations 44 may be solved simultaneously or by least squares for a sufficient number of member signals ($i \leqq j+k+1$) to give $\psi_j$, $\gamma_k$ and R which in turn can give values for $\theta_i$, $\phi_i$, $\lambda_o$ as distinct from their sum. For phase characterization of the general form specified it should be recognized that a timing correction would be needed for each member signal which would modify the determinations both of target relative velocity and target range.

The timing correction as described in certain of the previous embodiments can be computed theoretically or else can be determined by some empirical method using a known reflecting target 3 so that for values of $\theta_i$, $\phi_i$, $\lambda_o$, or $\psi_j$, $\gamma_k$, R an appropriate sum of corrections may be applied. Of course, once $\lambda_o$ and the timing correction for the propagation medium 2 are known, the phase distortion 2A of the medium is known according to equation 43 as is all other desired information. Note that the timing correction associated with $\lambda_o$ or R gives rise to no change in the computation for target relative velocity since, as was mentioned, all member signals are subjected to the same timing adjustment.

FIG. 9 represents the most general embodiment of the invention up to this point in a single signal band as defined by frequency range and polarization direction, if the latter is applicable. FIG. 5, on the other hand, depicts an embodiment in which the phase encoding of target parameters and propagation material properties (if applicable) would utilize a number of signal bands. It follows then that a more comprehensive embodiment may yet be envisaged in which a number of signal ands are employed, the technique in each single signal band being represented as in FIG. 9.

An embodiment as described would provide the greatest redundancy yet for the identification parameters of the reflecting target and would also allow the caracterization of the phase distortion of the propagation medium and/or the reflecting target in a number of frequency bands and polarization directions.

Another embodiment of the invention complementing all other variatioons described up to this point would include the use of amplitude spectral information determined either collectively from the received return signal or else computed from individual member signals as one additional target identification parameter describing its "quality". Referring to FIG. 4 in alternate 5G2 we first noted the use of Fourier analysis in the processing sequence for the received return signal 5A.

Throughout preceding discussions, the only modification admitted for the amplitude spectrum of the base signal pairs had been a Doppler induced effect. We shall now want to give cognizance to variations in the amplitude spectrum caused by frequency dependent alternative mechanisms of the propagation medium and also the frequency dependent reflective properties of the target.

A preferential loss of higher frequency commponents as a function of the length of propagation path is a common characteristic of most propagation media. Particular media can exhibit "window" effects where for certain frequencies or polarizations (if applicable) anomalous attenuation or lack of attenuation will occur. For all of the permissible base signals having either three or four fundamental properties, these effects should not alter in most circumstances the basic smooth and unimodal character of the amplitude spectrum and so the mathematical approximations presented would retain their validity. No effects would be induced on phase as it is measured here, since the base signals share a common amplitude spectrum.

Empirical studies have been cited in a number of previous discussions as a means for establishing standards or functional relationships necessary of the determination of certain of the target identification parameters. Clearly, by empirical studies it is possible to determine the absolute amplitudes and changes in form of the amplitude spectrum of member signals caused by a propagation medium so that these effects might be removed from consideration. Other differences of magnitude and form must then be diagnostic in some sense of the target, describing its quality.

Peculiarities of the target figure or shape, as well as perhaps a transitional character in reflective properties can cause modifications to the amplitude spectrum which might be unique to certain targets hence facilitating positive identifications, or else simply assisting in their categorization. We must also note in the context of target quality determination that phase plays some role, since it is a 180° phase shift or reversal of arithmetic sign of the echo which allows distinction between "hard" and "soft" targets where the magnitudes of the reflective contrasts between the target and the propagation medium are equal. The terminology "hard" is being applied to targets of materials in which the signal propagation velocity exceeds its velocity in the propagation medium.

Target quality information is contained in the member signals of the signal train as well as in the entire train itself. Hence as in the case of most of the other parameters describing the target, a measure of redundancy is again present.

Figure 10:
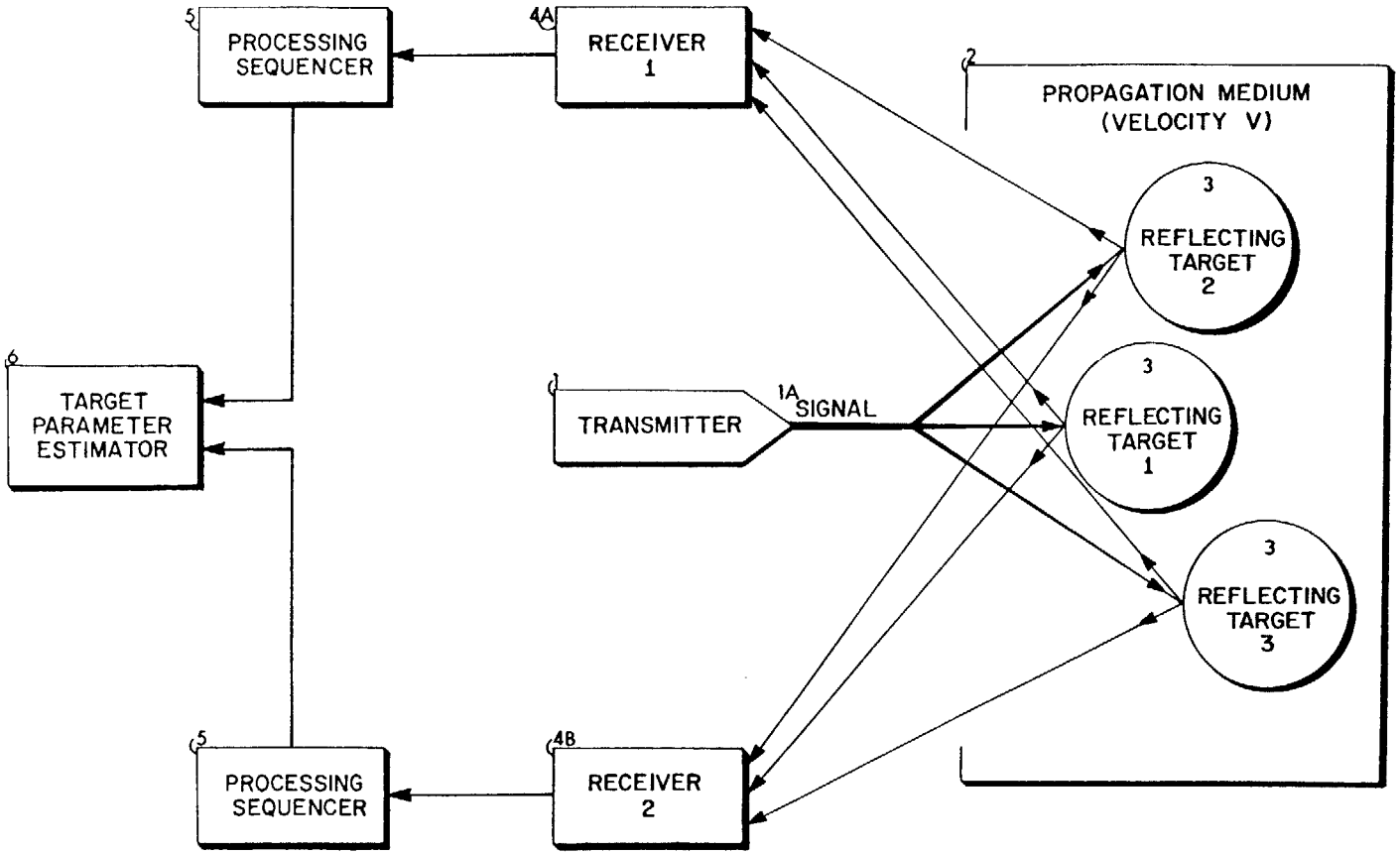
FIG. 10 shows another embodiment with a single transmitter, a single receiver and a multiplicity of reflecting targets.

FIG. 1 illustrates the most elementary embodiment of the invention described, but can be used to help explain the most encompassing embodiment of the invention yet to be described. All variations of the invention discussed so far have included a single transmitter 1, a single receiver 4, and single reflecting target 3. In fact, any number of any of these elements can be used, yet allowing all other essentials of the invention so that the plurality of reflecting targets can each be identified individually according to their parameters with whatever degree of redundancy the particular embodiment allows. FIG. 10 exemplifies such an embodiment based on the variation shown in FIG. 1.

In FIG. 10, three distinct reflecting targets 3, two distinct receivers 4A, 4B and a single transmitter 1 are shown. The propagating signal 1A is taken as in FIG. 1 and the propagation medium 2 is also as in FIG. 1. Each reflecting target returns an echo to each of the receivers 4A, 4B. The processing sequences 5 are essentially as depicted in greater detail in FIG. 2 except that each of the reflecting targets 3 now corresponds to a sequence of peaks in the step 5E of FIG. 2 which may have any arbitrary relation in time, one sequence to another, hence necessitating also the inclusion of some logic to separate the member peaks in each sequence so that target parameter estimates 6 can be made for each reflecting target. Since there are two receivers, the target parameter estimator 6 may now include angular information, even though the embodiment of FIG. 1 upon which we based this illustrative case made no provision for the inclusion of such information.

Figure 11:
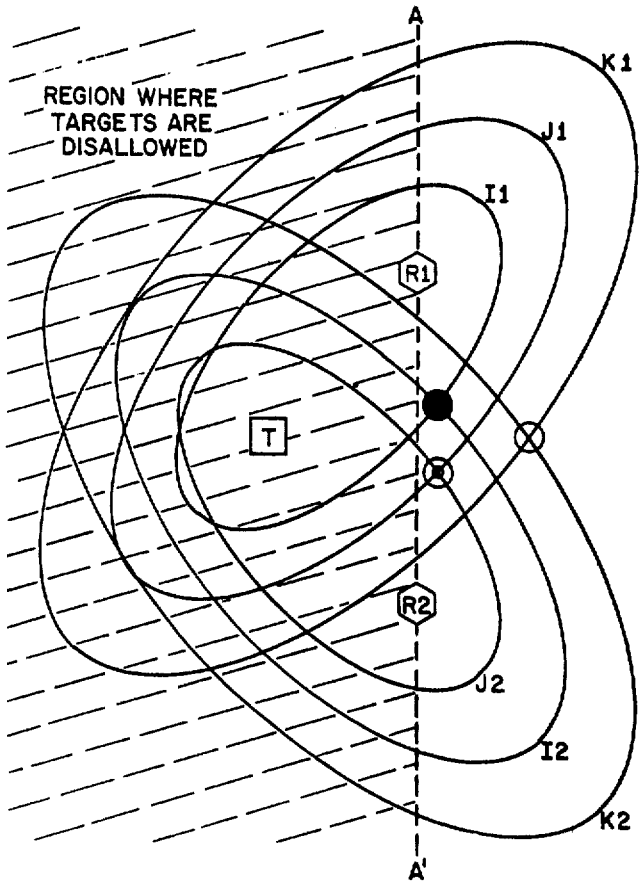
FIG. 11 shows the derivation of angles resolution by triangulation for an embodiment with a single transmitter, two receivers and a multiplicity of reflecting targets.

FIG. 11 suggests a familiar analytic basis by which the use of information from the two receivers 4A, 4B may be handled to yield angular information. The transmitter T and receivers R1, R2 of FIG. 11 occupy known relative positions which are either fixed or changing in a known manner in time. The processing sequence 5 as described by FIG. 2 is capable of estimating for each reflecting target only a range and relative velocity. For any estimated range, the permissive target locus is an ellipse with the transmitter and receiver which detected the particular echo at its focii. The intersection of the elliptical locii will define the target position and thus provide the angular information about the target expressed in the coordinate network of the transmitter and two receivers. Ambiguity of position can be eliminated as indicated again in FIG. 11 by designing the configuration so that certain positions are disallowed, as for example those to the left of the dashed line AA'.

It is important to mention that the logic by which the sequences corresponding to the differing targets are isolated can include clues about the consistency of relative velocity of the targets and even amplitude spectral information which in fact was not mentioned in the embodiment of FIG. 1, but was described in a later, more sophisticated technique.

To further illustrate the technique in which a plurality of elements is permissible, we address now the embodiment of FIG. 3, where angular information in one angle is one of the target identification parameters, and appeal also to a computer simulation. For illustrative purposes we adopt the configuration shown in FIG. 3 but declare only a plurality of reflecting targets, specifically three. The signal 1A from transmitter 1 is taken to be made of a Klauder base signal pair as described by equation 4 and depicted in FIG. 13.

Amplitudes of the three reflecting targets are taken to be in the ratio 4, 3, 2 while their initial ranges, angular information and relative velocities tabulate as:

| | Range (Arbitrary Units) | Angular Information | Relative Velocity (Ratio) | Amplitude (ratio) |
|---|---|---|---|---|
| Target 1 | 150 | 0° | 1 | 4 |
| Target 2 | 300 | −45° | 1.05[a] | 3 |
| Target 3 | 450 | 90° | .95# | 2 |

[a]approaching
#fleeing

Note that we are using the same convention for encoding the angular information as indicated in FIG. 15. We are assuming constant phase distortions imparted by the phase lens 7 of FIG. 3. Also, the target relative velocities are expressed as 1 and their ratios with the speed at which echo location signal 1A travels.

Since target 2 is approaching the detection system centroid while target 3 is fleeing, the expected target ranges for the assigned target relative velocities are 280 and 475 units respectively. Also, if all other parameters can be correctly identified, then a reconstruction of the received return signal 4 may be accomplished for comparison, with the observed one. Such a sequence is shown by the computer simulations of FIG. 19 where the noise-free and noisy case are examined.

Figure 19:
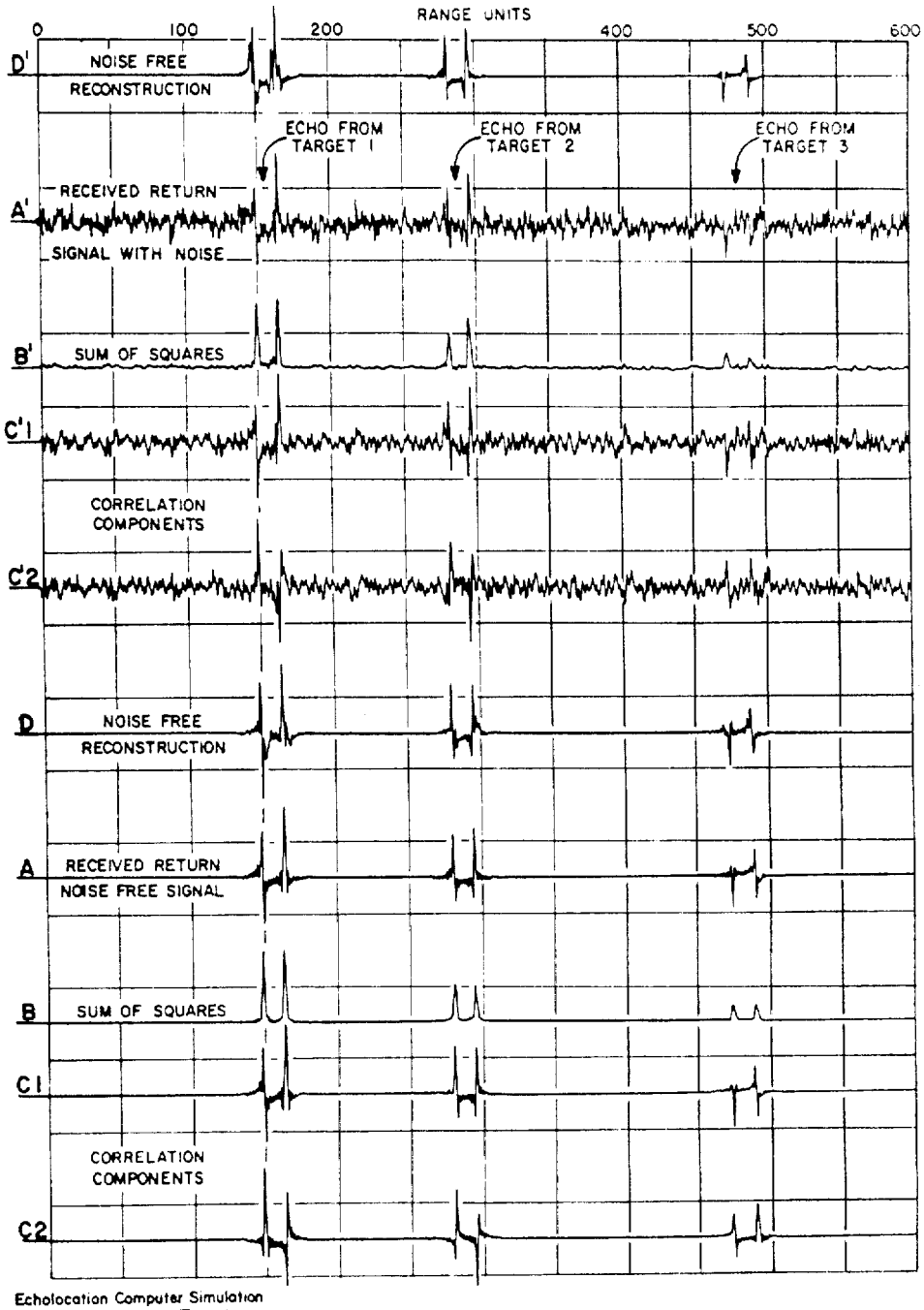
FIG. 19 shows a computer simulation of the invention utilizing three moving targets in the presence of random noise.

In FIG. 19, curve A is the observed received return signal 4. The reconstruction from detected parameters is denoted curve D. Curve B shows the sum of the squares of the correlation components, curves C1 and C2. Referring to FIG. 4 which describes the particular processing sequence 5, we recognize curve C1 as 5D1, curve C2 as 5D2 and curve B as 5E. The family of curves with primes represent results from the circumstance where background noise is present. For this case note that there is little difficulty in distinguishing among the reflecting targets.

Hence these illustrations make clear certain of the advantages of the embodiments which function in environments with a plurality of reflecting targets and utilize where beneficial, pluralities of transmitters and receivers.

A more general variation of the invention, encompassing all other variations described and which can be developed starting with any of these techniques, employs a base signal pair in the processing sequence which can differ from the base signal pair of the outgoing signal design. The two distinct base signal pairs shall be designated as the design signal pair and the processing signal pair respectively. For any given design signal pair, the admissible processing signal pairs must represent only rotations of the design signal pair phase spectra by a constant angle, and all differences in amplitude spectrum must be constrained such that the product of the design signal pair common amplitude spectrum and the processing signal pair common amplitude spectrum in itself has a form appropriate to a base signal pair.

All embodiments described heretofore employed a common base signal pair for the design of the outgoing signal train and the processing sequence. In fact, this restriction need not exist and we may with appropriate planning use an outgoing signal train developed with Klauder signals, yet select a processing base signal pair constructed with Gabor signals to extract desired target parameters (refer to equations 2B and 2C which specifically define Klauder and Gabor signals.)

Should the particular application of the invention not make use of phase encoding of information as the variation described in FIGS. 1 and 2, then both the design signal pair and processing signal pair would each have to satisfy only the first three fundamental properties which were outlined in that discussion. Where angular resolution via phase encoding is called upon, the fourth fundamental property introduced in the discussion of the application depicted in FIGS. 3 and 4 is needed. A modified form of this property may now be taken for both the design signal pair and the processing signal pair. Calling such a signal pair $f_k(t)$, $f_j(t)$ the revised statement of Property IV reads:

IV. $f_k(t)$ and $f_j(t)$ must be transformable to respective odd and even form about the central coordinate value in their interval of definition of duration a, by a constant shift of phase at all frequencies where the coordinate origin of definition of such phase is again taken at the same central coordinate value.

In reviewing the mathematical discussions of the simpler techniques it becomes clear that the processing sequences as described can progress up to determinations of phase using differing design and processing signal pairs having three or four fundamental properties as the application requires, and having permissible departures in amplitude spectra. Specifically, in the embodiment shown in FIG. 1, any appropriate processing signal pair allows completion of the entire processing sequence shown in FIG. 2 in its entirety with no modification. Alternatively, in the embodiment shown in FIG. 3 where phase encoding is employed to achieve angular resolution, the processing sequence of FIG. 4 would be unmodified through element 5F. Thereafter, an adjustment in phase related to the constant shift of the processing base pair relative to the design base pair described by the revised Property IV would be required.

For purposes of having a more concrete illustration, consider an outgoing signal train developed using as the design signal pair $f_k(t)$, $f_j(t)$ defined by equation 5 with the constraint of equation 6 and subject to equation 24. In the Fourier frequency domain following equation 25, we have the counterparts $$F_k(w)=F(w)e^{\pm i(\theta+\pi/2)}$$

$$F_j(w)=F(w)e^{\pm i\theta} \qquad 45$$

If we envisage a phase encoding mechanism as in the technique described by FIGS. 3 and 4, the received return signal 5A having undergone a constant phase shift now termed $\beta$ for the particular angular resolution, would have a form similar to equation 27 but specifically $$f_k(s(t-\alpha/2)-T,\theta+\beta)+f_j(s(t-\alpha/2-\gamma)-T,\theta+\beta) \qquad 46$$

In the Fourier frequency domain the received return signal 5A (also equation 46) is now $$F(w/s)e^{\mp i(\theta+\beta)}e^{\mp i\,w/s\,T/s}\{e^{\pm i(w/s\,\alpha'2)+\pi/2)}+e^{\pm i(w/s[\alpha/2+E])}\}. \qquad 47$$

(Compare with equation 28).

Let us select a processing signal pair $g_k(t)$, $q_j(t)$ defined analogously to $f_k(t)$, $f_j(t)$ having as Fourier frequency domain counterparts $$G_k(w)=G(w)e^{\pm i(\gamma+\pi/2)}$$

$$G_j(w)=G(w)e^{\pm i\gamma} \qquad 48$$

A(t), B(t) or 5D1, 5D2 of the processing sequence of FIG. 4 would then have as frequency domain equivalents $$A(w)=G(w)F(w/s)e^{\mp i(\theta+\beta-\gamma)}e^{\mp i\,w/s\,T/s}\{e^{\pm(w/s\,\alpha'2)+e^{\pm i(w/s[\alpha/2+\gamma]-\pi/2)}}\}$$

$$B(w)=G(w)F(w/s)e^{\mp(\theta+\beta-\gamma)}e^{\mp i\,w/s\,T/s}\{e^{\mp i(w/s\,\alpha'2+\pi/2)+e^{\mp(w/s[\alpha/2+\gamma])}}\} \qquad !$$

(Compare with equation 29).

From equation 49 onward this illustrative analysis may proceed in parallel with the development based on FIGS. 3 and 4 with two provisions. First, the product G(w)F(w/s) must define an amplitude spectrum which is essentially smooth and unimodal so that a signal pair analogous to $f_k'(t,\theta)$, $f_j'(t,\theta)$ of equation 30 may be defined. Second, the phase encoded angular information relating to $\beta$ can be determined only after compensating for the phase rotation of the design signal pair by $\theta$ and the processing signal pair rotation by $\gamma$. Note that the relative rotation between these two pairs is again constant and equal to $\theta-\gamma$. In particular, alternates 5G1 and 5G2 of FIG. 4 would both yield phase determinations in this case of $-(\theta+\beta+\gamma)$ which would give a value for $\beta$ when corrected as necessary for the known phase rotations $\theta$ and $\gamma$. (See for example equation 34).

The nature of the amplitude spectral differences permitted between the design signal pair and the processing signal pair is now greatly clarified. G(w) and F(w/s) must for all realistic Doppler variations governed by s overlap sufficiently in frequency w so that the product G(w)F(w/s) has a band width sufficiently broad to correspond to a signal of finite duration and impulsive character when transformed to the time domain with a constant zero phase spectrum. (This requirement is analogous in some measure to fundamental property II). Also, the product G(w) F(w/s) must have a character essentially as demanded in fundamental Property I.

It should be apparent to anyone with some background in signal processing that the permissible differences in the amplitude spectra of the design signal pair and the processing pair can often be used to great advantage. Techniques utilizing some "conditioning" of amplitude spectra in association with a correlation or convolution process are widely used and even standard in the treatment of signals for detection and other applications (see for example Phillip E. Panter, Modulation, Noise and Spectral Analysis, McGraw Hill, 759 P, 1965). By analogy, similar enhancement techniques can be designed to function in the context of this invention.

As a most elementary example of such a method, one may consider a practical environment which is attenuative in nature and preferentially removes the high frequency content of F(w/s) as the propagation distance to the target increases. For some approximation to the expected target range, G(w) might conversely give appropriate emphasis to the high frequencies so that the product F(w/s)G(w) is again almost flat. Such a method would improve both the resolution obtainable in the relative velocity determination and range calculation.

Hence this embodiment of the invention endows great flexibility in all the alternative variations making possible a number of advantages which can arise from a judicious manipulation of the amplitude and phase spectral character of the design signal pair and the processing signal pair. Introduction of a time variation in the definition of the processing signal pair might enhance detectability through amplitude spectral "whitening" while also compensating for the changing constant phase characteristic introduced by a propagation medium. The scope and significance of such possibilities can be appreciable.

What is claimed is:

1. A method of using a transmitter member and an arrangement of receivers having at least one receiver member, all members being at locations referred to a coordinate system of fixed origin and in a medium having a known signal propagation velocity function, for ascertaining, for a field containing one or more reflecting targets, information about the targets' [relfectivity] *reflectivity* strengths, positions and velocities as referred to said coorinate system, comprising the steps of:

producing a signal pattern having at least two individual member signals having preassigned time intervals, said time intervals and the durations of the member signals being short relative to a period over which velocity vectors describing motions of the transmitter, receivers and targets are approximately constants;

forming said individual member signals as a weighted sum of a design base signal pair, a pair of base signals approximately sharing a common smooth and essentially [unimodel] *unimodal* amplitude spectrum occupying a contiguous band of frequencies, said base signals being in mutual quadrature;

propagating said signal pattern with defined polarization character;

developing return signal patterns by reflection from the target field to each receiver;

processing reflected return signal patterns from each receiver by cross-correlating replicas of these return signal patterns with a detection base signal pair, thereby producing a pair of correlation component functions, said detection base signals having properties analogous to said design base signals, but with an amplitude spectrum overlapping that of the design base signal pair by an interval of frequency greater than any Doppler shift attributable to propagation toward and refelection from moving targets, the difference in phase angle between counterpart design and detection base signals at any common frequency component being described, in good approximation, mathematically by a constant and a term linear with frequency;

forming for each received return signal pattern a correlation amplitude function, formed from term-by-term sums of the absolute values of the correlation component functions raised to a like power not less than one, said sums then raised to a like power greater than zero but not greater than one;

identifying from the significant maxima of the correlation amplitude function return signal patterns corresponding to individual target reflections;

estimating for each detected target at each receiver a relative velocity component using the known signal propagation velocity function and the extension or compression of the initially preassigned time intervals between member signals in the return signal pattern for the target at the particular receiver, as determined from significant maxima of the correlation amplitude function;

estimating for each detected target at each receiver initial relative range information using an effective signal propagation velocity developed from the target's relative velocity estimate and known medium velocity function along with the elapsed signal travel time for onset of the return signal pattern identifying a target;

calculating final relative range information by introducing timing corrections to the elapsed signal travel time, such corrections representing linear elements of phase distortions arising from propagation, such corrections being dependent upon empirical tests using targets of known parameters, these corrections being catalogued according to initial range estimates, the conversion to final range information using the effective signal propagation velocity with the corrected elapsed time;

referring all estimates of target ranges and velocities to the fixed coordinate system; and characterizing each member of the target field according to reflectivity, magnitudes being estimated from magnitudes of particular target correlation amplitude functions, accounting for losses associated with propagation and other observable and controllable signal amplitude modifications which are obtainable from empirical tests using targets of known parameters, and reflectivity polarities being determined from return signal pattern polarities as compared with the initial outgoing signal polarities.

2. The method according to claim 1 wherein more than one transmitter is used concurrently, and producing outgoing signal patterns from each transmitter separable by a combination of any distinction according to polarization character and the frequency filtering produced by said cross-correlating.

3. The method according to claim 2 wherein for at least one received return signal train, positional information in the form of one angle for each target is encoded, and differentiating reflecting targets additionally by using amplitude spectral modifications of the member signals of the received return signal train;

employing for transmitters and receivers related to said encoding, impulse-like design and detection base signals, individual base signals having the further property that the phase angles for all significant frequencies are described mathematically, in good approximation, by a constant and a term linear in frequency;

encoding the angular positional information for each target as a phase modification, which is alike for each member signal of the signal train to be received, by interposing a phase adjustment element into the signal propagation path such that targets distinctive in their angular positional information will have distinctive phase modifications, any phase modification being described, in good approximation mathematically, by a constant and a term linear in frequency for all significant frequencies, the angular positional information being functionally related to the constant phase modifications by single valued functions determined by empirical tests using targets of known parameters, the linear phase modification with frequency being determined and catalogued according to the constant phase modification as a timing correction;

forming an initial constant phase modification estimate for individual member signals of the received return signal train and the correlation components, wherein member signals are identified at time origins corresponding to the times of the significant maxima of the correlation amplitude function;

compensating the initial constant phase modification for the initial constant value of the design base signal, for the phase difference between the design and detection base signals, and for any constant phase distortion approximating effects of propagation, said distortion due to propagation being determined by empirical tests using targets of known parameters and catalogued according to initial target range estimates;

calculating final relative range information, including an additional timing correction to the elapsed signal travel time, such corrections representing linear elements of phase distortion arising from said phase adjustment element, said distortions being determined from the catalogued values corresponding to the compensated initial constant phase modification estimate;

forming the angular positional information from the compensated initial constant phase modification estimates using said single-valued functions;

incorporating angular positional information with other estimated target positional and velocity information in the fixed coordinate system; and differentiating reflecting targets by using amplitude spectra of returning member signals for each target, adjusting said spectra for known modifications resulting from signal propagation and accompanying phase adjustment element effects, determined from empirical tests using targets of known parameters.

4. The method according to claim 3 wherein the initial constant phase modification estimate is formed from calculations of phase spectra for individual member signals of the received return signal train and the correlation components.

5. The method according to claim 3 wherein initial constant phase modification estimates for individual member signals are derived from the arctangent functions of ratios formed from values of the correlation components at times corresponding to time origins for member signals appertaining to reflection from a particular target, any pair of said values being appropriate to forming a ratio when their corresponding member signals are in quadrature; and developing additional ratios from values of said reflected return signal pattern at times corresponding to member signal origins appertaining to a particular target, whose numerator is derived from a member signal in quadrature with the denominator.

6. The method of claim 3 wherein for at least one received return signal train, positional information in the form of at least one angle for each target is encoded, such that for each target different phase encodings are imparted for the same angular information in different member signals, interposing for each transmitter and receiver related to said encoding a second phase adjustment element into the signal propagation path, changing at least one phase adjustment element for at least one member signal of the train to be received the total number of said changes being no less than one less than the number of positional information angles desired for each target;

designating phase encodings having independence such that the compensated constant phase modifications estimated from individual member signals and the known functional relationships between the phase adjustment element encodings and the desired angles develop a set of equations having as unknowns the target positional information, the number of equations being at least equal to the number of unknowns thereby allowing their solutions, and applying timing corrections to individual member signals to compensate also for linear phase effects of phase adjustment elements, such corrections now modifying also final relative velocity component estimates as well as relative range information.

7. The method according to claim 6 wherein for at least one received return signal train, constant phase distortions approximating the properties of each reflecting target are estimated, developing at least one set of equations for the desired angular positional information for each target having at least one more equation than unknowns and including as an additional unknown variable the constant phase distortion introduced by the target, phase encodings having been selected to allow at least as many independent equations as the total of unknowns, and incorporating phase distortion properties of each target as an additional target identifier.

8. The method according to claim 6 wherein for at least one received return signal train a constant phase distortion approximating uncompensated properties of the propagation medium is estimated, and developing at least one set of equations for the desired angular positional information for each target having at least one more equation than unknowns and including as an additional unknown variable the constant phase distortion approximating properties of the propagation medium, phase encodings having been selected to allow at least as many independent equations as the total of unknowns.

*9. The method according to claim 1 wherein for at least one received return signal train, positional information in the form of one angle for each target is encoded, and differentiating reflecting targets additionally by using amplitude spectral modifications of the member signals of the received return signal train;*

*employing for transmitters and receivers related to said encoding, impulse-like design and detection base signals, individual base signals having the further property that the phase angles for all significant freqencies are described mathematically, in good approximation, by a constant and a term linear in frequency;*

*encoding the angular positional information for each target as a phase modification, which is alike for each member signal of the signal train to be received, by interposing a phase adjustment element into the signal propagation path such that targets distinctive in their angular positional information will have distinctive phase modifications, any phase modification being described, in good approximation mathematically, by a constant and a term linear in frequency for all significant frequencies, the angular positional information being functionally related to the constant phase modifications by single value functions deter-*

*mined by empirical tests using targets of known parameters, the linear phase modification with frequency being determined and catalogued according to the constant phase modification as a timing correction;*

*forming an initial constant phase modification estimate for individual member signals of the received return signal train and the correlation components, wherein member signals are identified at time origins corresponding to the times of the significant maxima of the correlation amplitude function;*

*compensating the initial constant phase modification for the initial constant value of the design base signal, for the phase difference between the design and detection base signals, and for any constant phase distortion approximating effects of propagation, said distortion due to propagation being determined by empirical tests using targets of known parameters and catalogued according to initial target range estimates;*

*calculating final relative range information, including an additional timing correction to the elapsed signal travel time, such corrections representing linear elements of phase distortion arising from said phase adjustment element, said distortions being determined from the catalogues values corresponding to the compensated initial constant phase modification estimate;*

*forming the angular positional information from the compensated initial constant phase modification estimates using said single-valued functions;*

*incorporating angular positional information with other estimated target positional and velocity information in the fixed coordinate system; and*

*differentiating reflecting targets by using amplitude spectra of returning member signal for each target, adjusting said spectra for known modifications resulting from signal propagation and accompanying phase adjustment element effects determined from empirical tests using targets of known parameters.*

*10. The method according to claim 9 wherein said step of forming an initial constant phase modification estimate comprises forming such initial constant phase modification from calculations of phase spectra for individual member signals of the received return signal train and the correlation components.*

*11. The method according to claim 9 wherein said step of forming an initial constant phase modification comprises forming estimates for individual member signals derived from the arctangent functions of ratios formed from values of the correlation components at times corresponding to time origins for member signals appertaining to reflection from a particular target, any pair of said values being appropriate to forming a ratio when their corresponding member signals are in quadrature; and*

*developing additional ratios from values of said reflected return signal pattern, at times corresonding to member signal origins appertaining to a particular target, whose numerator is derived from a member signal in quadrature with the denominator.*

*12. The method of claim 9 wherein for at least one received return signal train, positional information in the form of at least one angle for each target is encoded, such that for each target different phase encodings are imparted for the same angular information is different member signals,*

*interposing for each transmitter and receiver related to said encoding a second phase adjustment element into the signal propagation path, changing at least one phase adjustment element for at least one member signal of the train to be received, the total number of said changes being no less than one less than the number of positional information angles desired for each target;*

*designating phase encodings having independence such that the compensated constant phase modifications estimated from individual member signals and the known functional relationships between the phase adjustment element encodings and the desired angles develop a set of equations having as unknowns the target positional information, the number of equations being at least equal to the number of unknowns thereby allowing thier solution, and*

*applying timing corrections to individual member signals to compensate also for linear phase effects of phase adjustment elements, such corrections now modifying alos final relative velocity component estimates as well as relative range information.*

*13. The method according to claim 12 wherein for at least one received return signal train, constant phase distortions approximating the properties of each reflecting target are estimated.*

*developing at least one set of equations for the desired angular positional information for each target having at least one more equation than unknowns and including as an additional unknown variable the constant phase distortion introduced by the target, phase encodings having been selected to allow at least as many independent equations as the total of unknowns, and*

*incorporating phase distortion properties of each target as an additional target identifier.*

*14. The method according to claim 12 wherein for at least one received return signal train a constant phase distortion approximating uncompensated properties of the propagation medium is estimated, and*

*developing at least one set of equations for the desired angular positional information for each target having at least one moe equation than unknowns and including as an additional unknown variable the constant phase distortion approximating properties of the propagation medium, phase encodings having been selected to allow at least as many independent equations as the total of unknowns.*

*15. A method of determining the velocity of a signal reflecting object positioned in a medium of known signal-propagation characteristics, relative to a signal transmitter and a signal receiver, comprising the steps of:*

*(a) transmitting at two distinct instants of time at least two signals having a pedetermined time interval therebetween, each signal having a continuous amplitude spectrum between low and high frequency limits, for reflection of the signals by the object;*

*(b) receiving the reflected signals;*

*(c) measuring only the time interval between the received signals; and*

*(d) determining the relative velocity of the object based only upon the measured time interval between the received signals and the predetermined time interval between the transmitted signals.*

*16. The method of claim 15, wherein said step of transmitting the signals comprises transmitting signals having an essentially short time duration.*

*17. The method of claim 16 wherein said step of transmitting the signals includes transmitting the signals in phase quadrature relative to each other.*

*18. The method of claim 16 wherein said steps of transmitting the signals comprises transmitting at least one*

*signal which is transformable to a symmetric signal relative to a time reference by adding a constant phase angle to the phase at each frequency.*

*19. The method of claim 16 wherein said step of transmitting the signal comprises transmitting pulse signals, each of which is transformable to a symmetric signal relative to a time reference by adding a constant phase angle to the phase at each frequency.*

*20. The method of claim 15, wherein the two distinct instants of time are predetermined, and further including the steps of:*

*(a) measuring the arrival time of at least one reflected signal,*

*(b) determining the signal transit time from the measured arrival time and the predetermined time instant of its transmission;*

*(c) correcting the transit time as a function of the determined velocity; and*

*(d) determining the distance of said object relative to the transmitter and the receiver as a function of the corrected transit time and the propagation characteristics of the medium.*

*21. A method of determining the direction of a signal reflecting object relative to a signal transmitter and a signal receiver, comprising the steps of:*

*(a) transmitting a signal from the transmitter, such signal having a continuous amplitude spectrum between low and high frequency limits, for reflection from the object;*

*(b) receiving the reflected signal with the receiver;*

*(c) changing the phase of the transmitted signal in dependence upon the direction of its travel while propagating between the transmitter and the receiver, such phase change characterized other than by a simple time delay;*

*(d) measuring the phase of the received reflected signal; and*

*(e) determining the direction of the object based on the measured phase.*

*22. The method of claim 21 wherein said step of transmitting a signal comprises transmitting a signal having a phase change comprising a constant for each direction independent of frequency.*

*23. The method of claim 22 wherein said step of changing the phase of the signal comprises:*

*propagating the signal through a medium having a dimension which varies in dependence upon the direction of travel of the signal.*

*24. The method of claim 21 wherein said step of changing the phase of the signal comprises:*

*propagating the signal through a medium having a dimension which varies in dependence upon the direction of travel of the signal.*

*25. A method of ascertaining the range of one or more reflecting targets in a target field referred to a coordinate system comprising the steps of:*

*(a) producing a signal having a linear combination of at least a pair of base signals such signals having the properties of:*

*(1) sharing a common amplitude spectrum which is essentially flat or smoothly unimodal occupying a contiguous band of frequencies;*

*(2) having a finite time interval before and after which each signal of said pair of base signals is zero;*

*(3)* each base signal of such pair being in phase quadrature to the other member of the pair;

*(b) transmitting the signal pattern into the target field;*

*(c) receiving reflections of the transmitted signal pattern from the target field; and*

*(d) processing the received reflections to ascertain the range of at least one of such targets in the target field.*

*26. A method of ascertaining the range and velocity of one or more reflecting targets in a target field referred to a coordinate system comprising the steps of:*

*(a) producing a signal pattern having at least two signals, each being a linear combination of at least a pair of base signals said base signals having the properties of:*

*(1) sharing a common amplitude spectrum which is essentially flat or smootly unimodal occupying a contiguous band of frequencies;*

*(2) having a finite time interval before and after which each signal of said pair of base signals is zero;*

*(3) each base signal of such pair being in phase quadrature to the other member of the pair;*

*(b) transmitting the signal pattern into the target field during at least partially different time intervals for each signal of the signal pattern;*

*(c) receiving reflections of the transmitted signal pattern from the target field; and*

*(d) processing the received reflections to ascertain the range and velocity of at least one of such targets in the target field.*

*27. A method of ascertaining the angular information of one or more reflecting targets in a target field referred to a coordinate system comprising the steps of:*

*(a) producing a signal being a linear combination of a pair of base signals such signals having the properties of:*

*(1) sharing a common amplitude spectrum which is essentially flat or smoothly unimodal occupying a contiguous band of frequencies*

*(2) having a finite time interval before and after which each signal of said pair of base signals is zero*

*(3) each base signal of such a pair being in phase quadrature to the other member of the pair; and*

*(4) each of such pair of base signals being transformable to a symmetric signal relative to a time reference by adding a constant phase angle to the phase at each frequency;*

*(b) transmitting the signal pattern;*

*(c) introducing a phase distortion, having a component independent of frequency, which varies in a known and single valued manner according to desired angular information into the signal propagation path;*

*(d) receiving reflections of the transmitted signal pattern from the target field; and*

*(e) processing the received reflections to ascertain the angular information for at least one of such targets in the target field.*

*28. The method of claim 27, further including the step of determining the range of at least one of the targets, comprising the step of:*

*processing the received reflections to ascertain the range of at least one of such targets in the target field.*

*29. The method of claim 27, further including the step of determining the range and velocity of at least one of the targets, comprising the steps of:*

*producing a signal pattern comprising of at least two said signals,*

*transmitting the signal pattern into the target field during at least partially different time intervals for each signal of the signal pattern, and*

*processing the received reflections to ascertain the range and velocity of at least one of such targets in the target field.*

*30. The method of claim 27, wherein said step of producing a pair of base signals comprises producing signals with the property of:*

*one of each such pair of base signals being odd about a central coordinate value in its finite time interval and the other of each such pair being even with respect to its central coordinate value.*

*31. The method of claim 27, further including the step of ascertaining angular information regarding more than one angle of at least one of the targets, comprising the steps of:*

*(a) producing a signal pattern comprising at least two signals each said signal being a linear pair combination of base signals each having the properties of:*

*(1) sharing a common amplitude spectrum which is essentially flat or smoothly unimodal occupying a contiguous band of frequencies;*

*(2) having a finite time interval before and after which each signal of each said pair of base signals is zero;*

*(3) each base signal of such a pair being in phase quadrature to the other member of the pair;*

*(4) each of such pair of base signals being transformable to a symmetric signal relative to a time reference by adding a constant phase angle to the phase at each frequency; and*

*(5) each pair of such base signals occupying at least partially non-overlapping band of frequency from the other pairs;*

*(b) transmitting such signal pattern;*

*(c) introducing phase distortions having a component independent of frequency which vary in a known and single valued manner according to desired angular information into the signal propagation path, differing angular information being introduced in differing frequency bands;*

*(d) receiving reflections of the transmitted signal pattern from the target field; and*

*(e) processing the received reflections to ascertain the angular information for at least one of such targets in the target field.*

*32. The method of claim 27, further including the step of ascertaining angular information regarding more than one angle of at least one of the targets, comprising the steps of:*

*(a) producing a signal pattern comprising at least two signals each said signal being a linear pair combination of base signals each having the properties of:*

*(1) sharing a common amplitude spectrum which is essentially flat or smoothly unimodal occupying a contiguous band of frequencies;*

*(2) having a finite time interval before and after which each signal of each said pair of base signals is zero;*

*(3) each base signal of such a pair being in phse quadrature to the other member of the pair;*

*(4) each of such pair of base signals being transformable to a symmetric signal relative to a time reference by adding a constant phase angle to the phase at each frequency; and*

*(5) each pair of such base signals occupying at least a partially overlapping band of frequency from the other pairs;*

*(b) transmitting such signal pattern;*

*(c) phase encoding positional information about plural angles in each signal;*

*(d) receiving reflections of the transmitted signal pattern from the target field; and*

*(e) processing the received reflections to ascertain the angular information for at least one of such targets in the target field.*

*33. The method of claim 32, wherein said step of phase encoding comprises the step of:*

*introducing phase distortions having a component independent of frequency which vary in a known and single valued manner according to desired angular information into the signal propagation path, differing angular information being introduced into member signals of the signal pattern with independent phase encoding.*

*34. A system for determining the velocity of a signal reflecting object positioned in a medium of known signal-propagation characteristics comprising:*

*(a) signal transmitter means for transmitting at two distinct instants of time at least two signals having a predetermined time interval therebetween, each signal having a continuous amplitude spectrum between low and high frequency limits, for reflection of the signals by the object;*

*(b) signal receiver means for receiving the reflected signals;*

*(c) processing sequencer means for measuring only the time interval between the received signals; and*

*(d) parameter estimator means for determining the relative velocity of the object based only upon the measured time interval between the received signals and the predetermined time interval between the transmitted signals.*

*35. The system of claim 34, wherein the two distinct instants of time are predetermined, and wherein:*

*(a) said processing sequencer means comprises means for measuring the arrival time of at least one reflected signal and determining the signal transit time from the measured arrival time and the time instant of its transmission,*

*(b) said parameter estimator means comprises means for correcting the transit time as a function of the determined velocity, and determining the distnace of said object relative to said transmitter means and said receiver means as a function of the corrected transit time and the propagation characteristics of the medium.*

*36. A system for determining the direction of a signal reflecting object, comprising:*

*(a) transmitter means for transmitting a signal having a continuous amplitude spectrum between low and high frequency limits, for reflection from the object;*

*(b) receiver means for receiving the reflected signal;*

*(c) phase lens means for changing the phase of the signal in dependence upon the direction of its travel while propagating between said transmitter means and said receiver means, such phase change characterized other than by a simple time delay;*

*(d) processing sequencer means for measuring the phase of the received reflected signal; and*

*(e) parameter estimator means for determining the direction of the object based on the measured phase.*

*37. The system of claim 36 wherein said phase lens means for changing the phase comprises means for changing the phase by a constant for each direction independent of frequency.*

*38. The system of claim 37 wherein said phase lens means for changing the phase of the signal comprises:*

*a medium having a dimension which varies in dependence upon the direction of travel of the signal.*

*39. The system of claim 36 wherein said phase lens means for changing the phase of the signal comprises:*

*a medium having a dimension which varies in dependence upon the direction of travel of the signal.*

*40. A system for ascertaining the range of one or more reflecting targets in a target field referred to a coordinate system, comprising:*

*(a) transmitter means for producing and transmitting into the target field a signal pattern having a linear combination of at least a pair of base signals, such signals having the properties of:*

*(1) sharing a common amplitude spectrum which is essentially flat or smoothly unimodal occupying a contiguous band of frequencies;*

*(2) having a finite time interval before and after which each signal of said pair of base signals is zero;*

*(3) each base signal of such pair being in phase quadrature to the other member of the pair;*

*(b) means for receiving reflections of the transmitted signal pattern from the target field; and*

*(c) means for processing the received reflections to ascertain the range of at least one of such targets in the target field.*

*41. A system for ascertaining the range and velocity of one or more reflecting targets in a target field referred to a coordinate system of fixed origin, comprising:*

*(a) transmitter means for producing and transmitting into the target field a signal pattern having at least two signals during at least partially different time intervals for each signal of the signal pattern, each signal being a linear combination of at least a pair of base signals, said base signals having the properties of:*

*(1) sharing a common amplitude spectrum which is essentially flat or smoothly unimodal occupying a contiguous band of frequencies;*

*(2) having a finite time interval before and after which each signal of said pair of base signals is zero;*

*(3) each base signal of such pair being in phase quadrature to the other member of the pair;*

*(b) means for receiving reflections of the transmitted signal pattern from the target field; and*

*(c) means for processing the received reflections to ascertain the range and velocity of at least one of such targets in the target field.*

*42. A system for ascertaining the angular information of one or more reflecting targets in a target field referred to a coordinate system, comprising:*

*(a) transmitter means for producing and transmitting into the target field a signal pattern being a linear combination of a pair of base signals, such signals having the properties of:*

*(1) sharing a common amplitude spectrum which is essentially flat or smoothly unimodal occupying a contiguous band of frequencies;*

*(2) having a finite time interval before and after which each signal of said pair of base signals is zero;*

*(3) each base signal of such a pair being in phase quadrature to the other member of the pair; and*

*(4) each of such pair of base signals being transformable to a symmetric signal relative to a time reference by adding a constant phase angle to the phase at each frequency;*

*(b) phase lens means for introducing a phase distortion, having a component independent of frequency, which varies in a known and single valued manner according to desired angular information into the signal propagation path;*

*(c) means for receiving reflections of the transmitted signal pattern from the target field; and*

*(d) means for processing the received reflections to ascertain the angular information for at least one of such targets in the target field.*

*43. The system of claim 42, wherein said means for processing comprises:*

*means for processing the received reflections to ascertain the angular information and range for at least one of such targets in the target field.*

*44. The system of claim 42, wherein:*

*said transmitter means comprises means for producing and transmitting into the target a signal pattern comprising at least two said signals during at least partially different time intervals for each signal of the signal pattern, and*

*said means for processing comprises means for processing the received reflections to ascertain the range and velocity of at least one of such targets in the target field.*

*45. The system of claim 42, wherein:*

*(a) said transmitter means comprises means for producing and transmitting into the target field a signal pattern comprising at least two signals each said signal being a linear combination of a pair of base signals, each having the properties of:*

*(1) sharing a common amplitude spectrum which is essentially flat or smoothly unimodal occupying a contiguous band of frequencies;*

*(2) having a finite time interval before and after which each signal of each said pair of base signals is zero;*

*(3) each base signal of such a pair being in phase quadrature to the other member of the pair;*

*(4) each of such pair of base signals being transformable to a symmetric signal relative to a time reference by adding a constant phase angle to the phase at each frequency; and*

*(5) each pair of such base signals occupying at least partially non-overlapping band of frequency from the other pairs;*

*(b) said phase lens means for introducing phase distortions comprises means introducing phase distortions having a component independent of frequency which varies in a known and single valued manner according to desired angular information into the signal propagation path, differing angular information being introduced in differing frequency bands;*

*(c) said means for processing comprises means for processing the received reflections to ascertain the angular information for at least one of such targets in the target field.*

*46. The system of claim 42, wherein:*

*(a) said transmitter means comprises means for producing and transmitting into the target field a signal pattern comprising at least two signals, each said signal being a linear pair combination of base signals, each having the properties of:*

*(1) sharing a common amplitude spectrum which is essentially flat or smoothly unimodal occupying a contiguous band of frequencies;*

*(2) having a finite time interval before and after which each signal of each said pair of base signals is zero;*

*(3) each base signal of such a pair being in phase quadrature to the other member of the pair;*

*(4) each of such pair of base signals being transformable to a symmetric signal relative to a time reference by adding a constant phase angle to the phase at each frequency; and*

*(5) each pair of such base signals occupying at least partially overlapping band of frequency from the other pairs;*

*(b) said phase lens means includes means for phase encoding positional information about plural angles in each signal; and*

*(c) said means for processing comprises means for processing the received reflections to ascertain the angular information for at least one of such targets in the target field.*

* * * * *